United States Patent
Ramasubramonian et al.

(10) Patent No.: US 11,847,801 B2
(45) Date of Patent: *Dec. 19, 2023

(54) SECONDARY COMPONENT ATTRIBUTE CODING FOR GEOMETRY-BASED POINT CLOUD COMPRESSION (G-PCC)

(71) Applicant: QUALCOMM Incorporated, San Diego, CA (US)

(72) Inventors: Adarsh Krishnan Ramasubramonian, Irvine, CA (US); Bappaditya Ray, San Diego, CA (US); Geert Van der Auwera, San Diego, CA (US); Louis Joseph Kerofsky, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,135

(22) Filed: Jan. 23, 2023

(65) Prior Publication Data

US 2023/0162406 A1 May 25, 2023

Related U.S. Application Data

(63) Continuation of application No. 17/224,827, filed on Apr. 7, 2021, now Pat. No. 11,562,509.

(Continued)

(51) Int. Cl.
*H04N 19/124* (2014.01)
*G06T 9/00* (2006.01)
*G06T 15/30* (2011.01)

(52) U.S. Cl.
CPC .............. *G06T 9/001* (2013.01); *G06T 15/30* (2013.01); *H04N 19/124* (2014.11); *G06T 9/00* (2013.01)

(58) Field of Classification Search
CPC ........... G06T 9/001; G06T 15/30; G06T 9/00; H04N 19/124

(Continued)

(56) References Cited

U.S. PATENT DOCUMENTS 11,122,102 B2   9/2021   Oh
11,558,643 B2 * 1/2023   Ramasubramonian ..................... H04N 19/174

(Continued)

OTHER PUBLICATIONS

3DG: "G-PCC Codec Description v5", Coding of Moving Pictures and Audio, ISO/IEC JTC1/SC29/WG11, N18891, Oct. 2019, Geneva, CH, Dec. 13, 2019, 75 pages, XP030225589, Retrieved from the Internet: URL: http://phenix.int-evry.fr/mpeg/doc_end_user/documents/128_Geneva/wg11/w18891.zip w18891.docx—[retrieved on Dec. 18, 2019].

(Continued)

*Primary Examiner* — Kathleen M Walsh
(74) *Attorney, Agent, or Firm* — QUALCOMM Incorporated; Espartaco Diaz Hidalgo

(57) ABSTRACT

In some examples, a method of decoding a point cloud includes decoding an initial QP value from an attribute parameter set. The method also includes determining a first QP value for a first component of an attribute of point cloud data from the initial QP value. The method further includes determining a QP offset value for a second component of the attribute of the point cloud data and determining a second QP value for the second component of the attribute from the first QP value and from the QP offset value. The method includes decoding the point cloud data based on the first QP value and further based on the second QP value.

19 Claims, 11 Drawing Sheets

Related U.S. Application Data

(60) Provisional application No. 63/020,420, filed on May 5, 2020, provisional application No. 63/007,264, filed on Apr. 8, 2020.

(58) Field of Classification Search
USPC .......................................................... 382/232
See application file for complete search history.

(56) References Cited

U.S. PATENT DOCUMENTS

| | | | | |
|---|---|---|---|---|
| 11,562,509 | B2* | 1/2023 | Ramasubramonian | ...................... G06T 15/30 |
| 2017/0347120 | A1* | 11/2017 | Chou | ...................... H04N 19/86 |
| 2019/0087979 | A1* | 3/2019 | Mammou | ............ H04N 19/597 |
| 2021/0029187 | A1* | 1/2021 | Oh | .......................... H04L 65/61 |
| 2021/0104013 | A1* | 4/2021 | Hur | ........................... G06T 3/40 |
| 2021/0337202 | A1* | 10/2021 | Xiu | ...................... H04N 19/186 |

OTHER PUBLICATIONS

3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.

3DG: "G-PCC Future Enhancements", International Organisation for Standardisation Organisation Internationale De Normalisation, ISO/IEC JTC 1/SC 29/WG 11 Coding of Moving Pictures and Audio, ISO/IEC JTC 1/SC 29/WG 11, N18887, Geneva, CH—Oct. 2019, 128. MPEG Meeting, Oct. 7-11, 2019, Geneva, (Motion Picture Expert Group or ISO/IEC JTC1/SC29/WG11), No. n18887, Dec. 23, 2019, XP030225587, 277 Pages.

"Information Technology—MPEG-I (Coded Representation of Immersive Media)—Part 9: Geometry-based Point Cloud Compression", ISO/IEC 23090-9:2020(E), ISO/IEC JTC 1/SC 29/WG 11, 2020, 177 pages.

Information Technology—MPEG-I (Coded Representation of Immersive Media)—Part 9: Geometry-based Point Cloud Compression, ISO/IEC 23090-9:2020(E), ISO/IEC JTC 1/SC 29/WG 11, Jan. 13-17, 2020; Brussels; (Motion Picture Expert Group or ISO/IEC JTC1/SC29/WG11), No. n19088, Apr. 20, 2020, XP030287968, 127 pages.

International Search Report and Written Opinion—PCT/US2021/026433—ISA/EPO—dated Jul. 5, 2021.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Ramasubramonian A.K., et al., "[G-PCC] [New Proposal] On Attribute QP Derivation", 131. MPEG Meeting, Jun. 29-Jul. 3, 2020, Online, (Motion Picture Expert Group or ISO/IEC JTC1/SC29/WG11), No. m54698, Jun. 24, 2020 (Jun. 24, 2020), 3 pages, XP030289268, Retrieved from the Internet: URL: http://phenix.int-evry.fr/mpeg/doc_end_user/documents/131_OnLine/wg11/m54698-v1-m54698.zip, m54698.docx [retrieved on Jun. 24, 2020].

Ramasubramonian (Qualcomm) A.K., et al., "[G-PCC] On Quantization Parameters in G-PCC", 129. MPEG Meeting, Jan. 13-17, 2020, Brussels, Belgium (Motion Picture Expert Group or ISO/IEC JTC1/SC29/WG11), No. m52501, Jan. 16, 2020 (Jan. 16, 2020), XP030225166, 9 Pages.

Ray (Qualcomm) B., et al., "[G-PCC] High Level Syntax Cleanup of G-PCC", 129, MPEG Meeting, Jan. 13-17, 2020, Brussels, (Motion Picture Expert Group or ISO/IEC JTC1/SC29/WG11), No. m52342, Jan. 14, 2020, XP030224976, 12 Pages.

Ray (Qualcomm) B., et al., "[G-PCC][new] Attribute Related High Level Syntax—Fixes and Improvements", 130. MPEG Meeting, Apr. 20-24, 2020, Alpbach, AT, International Organisation For Standardisation Organisation Internationale De Normalisation ISO/IEC JTC1/SC29/WG11 Coding of Moving Pictures and Audio, ISO/IEC JTC1/SC29/WG11 MPEG2020/M53652 (Motion Picture Expert Group or ISO/IEC JTC1/SC29/WG11), No. m53652, Apr. 15, 2020, 17 Pages.

\* cited by examiner

SECONDARY COMPONENT ATTRIBUTE CODING FOR GEOMETRY-BASED POINT CLOUD COMPRESSION (G-PCC)

This application is a continuation of U.S. Non-Provisional application Ser. No. 17/224,827, filed on Apr. 7, 2021, which claims benefit of U.S. Provisional Patent Application No. 63/007,264, filed on Apr. 8, 2020, and U.S. Provisional Patent Application No. 63/020,420, filed on May 5, 2020, the entire content of each of which is incorporated by reference herein.

TECHNICAL FIELD

This disclosure relates to point cloud encoding and decoding.

BACKGROUND

A point cloud is a collection of points in a three-dimensional space. The points may correspond to points on objects within the three-dimensional space. Thus, a point cloud may be used to represent the physical content of the three-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for encoding and decoding point clouds using geometry-based point cloud compression (G-PCC) techniques. In particular, this disclosure describes techniques that may improve the coding (e.g., encoding and/or decoding) of secondary components/dimensions of attributes in G-PCC. A point cloud contains a set of points in a 3D space, and may have one or more attributes associated with the points. The components of an attribute may be color information such as R, G, B or Y, Cb, Cr, Co, Cg, reflectance information, or other components. The techniques of this disclosure may improve the coding efficiency of a G-PCC encoder and/or G-PCC decoder by improving one or more of quantization parameter (QP) adaptation for secondary components, the efficiency of using multiple bitdepths for primary and secondary components, and the mapping of QP values for primary and secondary attribute components.

In addition, this disclosure describes techniques that may improve processes for quantizing and inverse quantizing component values of points in point clouds. The techniques of this disclosure may reduce consumption of computational resources, may provide increased compression, or may provide other benefits.

In one example, this disclosure describes a method of decoding a point cloud, the method comprising: decoding an initial QP value from an attribute parameter set; determining a first QP value for a first component of an attribute of the point cloud data from the initial QP value; determining a QP offset value for a second component of the attribute of the point cloud data; determining a second QP value for the second component of the attribute from the first QP value and from the QP offset value; and decoding the point cloud data based on the first QP value and further based on the second QP value.

In another example, this disclosure describes a device for decoding a point cloud, the device comprising: memory configured to store point cloud data; and one or more processors implemented in circuitry and communicatively coupled to the memory, the one or more processors being configured to: decode an initial QP value from an attribute parameter set; determine a first QP value for a first component of an attribute of the point cloud data from the initial QP value; determine a QP offset value for a second component of the attribute of the point cloud data; determine a second QP value for the second component of the attribute from the first QP value and from the QP offset value; and decode the point cloud data based on the first QP value and further based on the second QP value.

In another example, this disclosure describes a computer-readable storage medium having stored thereon instructions that, when executed, cause one or more processors to: decode an initial QP value from an attribute parameter set; determine a first QP value for a first component of the attribute of the point cloud data from the initial QP value; determine a QP offset value for a second component of the attribute of the point cloud data; determine a second QP value for the second component of the attribute from the first QP value and from the QP offset value; and decode the point cloud data based on the first QP value and further based on the second QP value.

In some examples, a system includes means for decoding an initial QP value from an attribute parameter set; means for determining a first QP value for a first component of an attribute of the point cloud data from the initial QP value; means for determining a QP offset value for a second component of the attribute of the point cloud data; means for determining a second QP value for the second component of the attribute from the first QP value and from the QP offset value; and means for decoding the point cloud data based on the first QP value and further based on the second QP value.

The details of one or more examples are set forth in the accompanying drawings and the description below. Other features and advantages will be apparent from the description, drawings, and claims.

DETAILED DESCRIPTION

Figure 1:
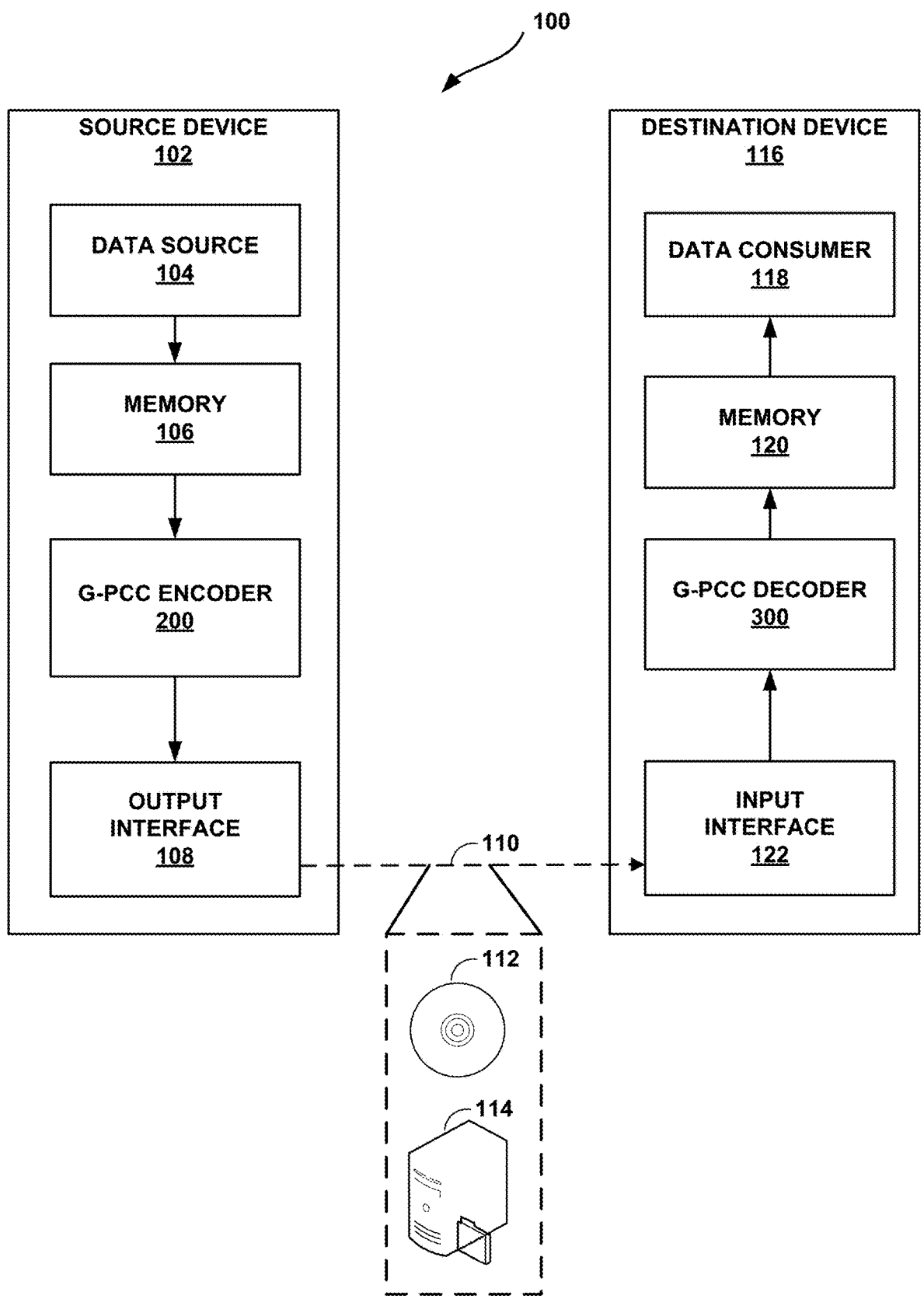
FIG. 1 is a block diagram illustrating an example encoding and decoding system that may perform the techniques of this disclosure.

Geometry-based point cloud compression (G-PCC) includes techniques for point cloud compression. In G-PCC, each point of a point cloud may be associated with a set of one or more attributes. The attributes of a point may provide light and/or color information about the point; attributes of a point may also include other characteristics such as reflectance, surface normal, etc. G-PCC allows the coding of different types of attributes. For instance, the components of an attribute of a point may include a luma value, one or two chroma values, and/or a reflectance value. In G-PCC, the attributes of a point may be signaled along with information about the three-dimensional position of the point. Furthermore, in G-PCC, high-level information about attributes may be signaled in an attribute parameter set (APS). The attributes of points may be signaled in "attribute slices." General information about one or more attribute slices may be signaled in an attribute slice header. One or more attribute slice headers may refer to an APS.

Because signaling the attributes of points in a point cloud may otherwise entail the transmission of significant amounts of data, some example G-PCC techniques specify processes for reducing the amount of data involved in signaling the attributes of the points. For instance, a G-PCC encoder may apply one or more transforms to the components of an attribute to generate coefficients representing the components. This disclosure may refer to coefficients representing the components of an attribute as component values or component coefficients. Additionally, the G-PCC encoder may quantize the component values which may result in a reduction of number of bits used to code the component values. The G-PCC encoder may apply arithmetic encoding to the quantized component values to further reduce the amount of data used to signal the quantized component values. A G-PCC decoder may apply inverse quantization to restore the component values in the original scale.

The quantization process used by G-PCC encoders and the inverse quantization process used by G-PCC decoders operate according to quantization parameters (QPs) that control amounts of quantization and inverse quantization to apply to component values. Because the human eye is more sensitive to changes in luminance than to changes in chrominance, different QPs may be used for first (e.g., luma, or G) component values and second/third (e.g., chroma and/or R, B) component values. A G-PCC decoder may determine the QP value that a G-PCC encoder used when quantizing a component value when inverse quantizing the component value. Accordingly, the G-PCC encoder may signal the QP value to the G-PCC decoder in some way. Because signaling QP values may add to the amount of data that is signaled, the G-PCC encoder may use a tiered approach for signaling QP values. For instance, the G-PCC encoder may signal an initial component QP value in an APS, e.g., in an aps_at-tr_initial_qp syntax element. The G-PCC encoder may also signal a QP offset value for a second component of an attribute in the APS, e.g., in an aps_attr_chroma_qp_offset syntax element. The QP offset value indicates an offset of an initial QP value for the second component from the initial component QP value.

Additionally, delta QP values for the first and second components of an attribute may be signaled in an attribute slice header (ASH) for a slice. The delta QP value for the first component signaled in the ASH (e.g., an ASH delta luma QP value) may indicate a difference between a QP value for the first component for a slice and the initial component QP signaled in an applicable APS. The delta QP value for the second component signaled in the ASH (e.g., an ASH delta chroma QP value) may indicate a difference between a QP value for the second component for the slice and the initial QP value for the second component signaled in the APS.

For further refinement of QP values, the ASH may include delta QP values for one or more layers. When components are coded using levels of detail, or using multiple hierarchical layers of the RAHT transform, the delta QP values may be specified to apply different quantization values for points belonging to different layers. For instance, the ASH may include an ASH layer delta QP value for the first component (e.g., an ash_attr_layer_qp_delta_luma syntax element) that indicates a difference between the QP value for the first component for the slice and a QP value for the first component for a layer. The ASH may also include an ASH layer delta QP value for the second component (e.g., an ash_attr_layer_qp_delta_chroma syntax element) that indicates a difference between the QP value for the second component for the slice and a QP for the second component for the layer.

Furthermore, the points associated with a layer of a slice may be divided into two or more regions. Some regions may be of greater importance than other regions. Thus, some regions may be referred to as regions-of-interest. Component values of points that are not within a region-of-interest (ROI) may be quantized more than component values of points that are within an ROI. Accordingly, a G-PCC encoder may signal, in an ASH, delta QP values for regions. The delta QP value for a region (e.g., ash_attr_region_qp_delta) may indicate a difference between a QP value for the first component for a slice or a layer and the luma QP value for the first component for the region, and may also indicate a difference between a QP value for the second component for the slice or the layer and the QP value for the second component for the region.

Thus, in the process described above, a G-PCC decoder may use a single delta QP value for the first and second components of a region in the slice header because only a single delta QP value is signaled for the region. The delta QP value for the region is applied for values of the first and second components. However, using the same delta QP value for both components for some regions may not be sufficient to produce desired levels of compression and/or quality. Using the same offset value for both components of an attribute may not optimally capture the spatial variation in the content because the characteristics of the first and second components may not be the same in every region of interest.

In addition, the QP value for a second component may often be the same or very similar to the QP value for a first component. The QP values for the first and second components may be the same or similar for a given slice, layer, and/or region. The G-PCC decoder can use the initial QP value, along with several offset and delta QP values, to determine the QP value for the second component in a region. However, this approach may not produce desired levels of compression because the slice header must signal the offset and delta terms for the first component and for the second component.

This disclosure describes techniques that may address one or more of these issues. For instance, in one example, a G-PCC decoder may reconstruct a position of a point of the point cloud and may inverse quantize component data for the point. The component data for the point may include a first value (e.g., a luma value) and a second value (e.g., a chroma value and/or a reflectance value). As part of inverse quantizing the component data, the G-PCC decoder may be configured to determine separate QP values for the first and second components. The G-PCC decoder may reconstruct a position of a point of the point cloud based on the separate QP values for the two components, which may improve the compression and/or quality of the point cloud data. In some examples, the characteristics of the first and second components may not be the same for a given region. Thus, using separate QP values for the first and second components may allow the G-PCC to tailor the quantization of each component to the spatial variation in the point cloud data. In examples in which the characteristics of the first and second components are the same or similar for a given region, the separate QP values may not be signaled, which can allow for further compression of the point cloud data.

In some examples, a G-PCC encoder may quantize a first component value for a point in the point cloud based on a QP value for the first component for the point and may quantize a second component value for the point based on a QP value for the second component for the point. The G-PCC encoder may signal, in a bitstream, data representing the quantized first component value for the point and the quantized second component value for the point. Additionally, the G-PCC encoder may signal, in the bitstream, a first component region QP delta syntax element that specifies a delta QP value from a slice QP value for the first component of the region. Based on the point being in the region, the QP value for the first component for the point may be equal to a value specified by the first component region QP delta syntax element plus the slice QP value for the first component of the region. The G-PCC encoder may signal, in the bitstream, a second component region QP delta syntax element that specifies a delta QP value from a slice QP for the second component of the region. Based on the point being in the region, the QP value for the second component for the point may be equal to a value specified by the second component region QP delta syntax element plus the slice QP value for the second component of the region.

Similarly, a G-PCC decoder may obtain, from a bitstream, a first component region QP delta syntax element that specifies a delta QP value from a slice QP value for the first component of a region. The G-PCC decoder may obtain, from the bitstream, a second component region QP delta syntax element that specifies a delta QP value from a slice QP value for the second component of the region. The G-PCC decoder may determine a QP value for a point of the point cloud based on the first component region QP delta syntax element. Additionally, the G-PCC decoder may determine a QP value for the second component for the point based on the second component region QP delta syntax element. The G-PCC decoder may inverse quantize a quantized second component value for the point based on the QP value for the first component for the point. The G-PCC decoder may inverse quantize a quantized second component value for the point based on the QP value for the second component for the point. Thus, there may be separate QP values for the first and second components for a region, which may produce better quality and/or better levels of compression.

Additionally or alternatively, the G-PCC decoder may be configured to determine a QP value for the second component from a QP value for the first component and a QP offset value. The QP values for the second component for slices, layers, or regions may be signaled in the point cloud data relative to the QP values for the first component using delta QP values. Generally, the quantization of the second component will be the same as or similar to the quantization of the first component, which allows for the G-PCC encoder to not signal the offset QP value for the second component. In examples in which the quantization of the second component is different from the quantization of the first component, the G-PCC encoder can signal the difference in QP values as an offset. Thus, signaling a QP offset value for the second component relative to the QP value for the first component can promote compression of the point cloud data.

In some examples, a G-PCC encoder may quantize a first component value for a point of the point cloud based on a first QP value and may quantize a second component value for the point based on a second QP value. The G-PCC encoder may signal, in a bitstream, data representing the quantized first component value for the point and the quantized second component value for the point. Additionally, the G-PCC encoder may signal, in the bitstream, a first delta QP syntax element for a layer that specifies a delta QP value from a slice QP value for the first component. Based on the point being in the layer, the QP value for the first component at the point may be equal to a value specified by the first delta QP syntax element plus the slice QP value for the first component. The G-PCC encoder may signal, in the bitstream, a second delta QP syntax element for the layer that specifies a delta QP value from a slice QP value for the second component. Based on the point being in the layer, the QP value for the second component at the point may be equal to a value specified by the second delta QP syntax element, plus an initial QP offset value for the second component, plus the slice QP value for the first component.

Similarly, a G-PCC decoder may obtain, from a bitstream, a first delta QP syntax element that specifies a delta QP value from a slice QP value for the first component. The G-PCC decoder may obtain, from the bitstream, a second delta QP syntax element that specifies a further QP offset value from an initial QP offset value for the second component. The G-PCC decoder may determine a QP value for the first component at a point of the point cloud based on the first delta QP syntax element. Additionally, the G-PCC decoder may determine a QP value for the second component at the point based on the second delta QP syntax element. The G-PCC decoder may inverse quantize a first quantized component value for the point based on the QP value for the first component at the point. The G-PCC decoder may inverse quantize a second quantized component value for the point based on the QP value for the second component at the point. Thus, there may be separate QP values for the first and second components in a layer and/or in a region, which may produce better quality and/or better levels of compression.

FIG. 1 is a block diagram illustrating an example encoding and decoding system 100 that may perform the techniques of this disclosure. The techniques of this disclosure are generally directed to coding (encoding and/or decoding) point cloud data, for example, to support point cloud compression. In general, point cloud data includes any data for processing a point cloud. The coding may be effective in compressing and/or decompressing point cloud data. In general, point cloud data includes any data for processing a point cloud.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (e.g., a laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, Light Detection and Ranging (LIDAR) devices, satellites, surveillance or security equipment, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to high level syntax of components for geometry-based point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform of the techniques of this disclosure related to high level syntax of components for geometry point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (e.g., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor, or other data source. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors, and processing devices such as local or remote servers, geographic mapping, surveillance, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of other approaches and will target creation of a standard. The group is working together on this exploration activity in a collaborative effort known as the 3-Dimensional Graphics Team (3DG) to evaluate compression technology designs proposed by their experts in this area. The 3DG group has been renamed as ISO/IEC JTC 1/SC 29/WG 7 3DG.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry, e.g., the position of a set of points in 3D space, and associated component values (for each point associated with the 3D geometry). G-PCC addresses the compression of point clouds in both Category 1 (static point clouds) and Category 3 (dynamically acquired point clouds). G-PCC Future Enhancements, ISO/IEC JTC1/SC29/WG11 w18887, Geneva, Switzerland, October 2019 (hereinafter, w18887), is a recent draft of the G-PCC standard. G-PCC Codec Description v5, ISO/IEC JTC1/SC29/WG11 w18891, Geneva, Switzerland, October 2019 (hereinafter, w18891), is a description of the codec.

A point cloud contains a set of points in a 3D space, and may have components associated with each point. The components may be or may include color information such as R, G, B or Y, Cb, Cr, or reflectance information, or other components. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
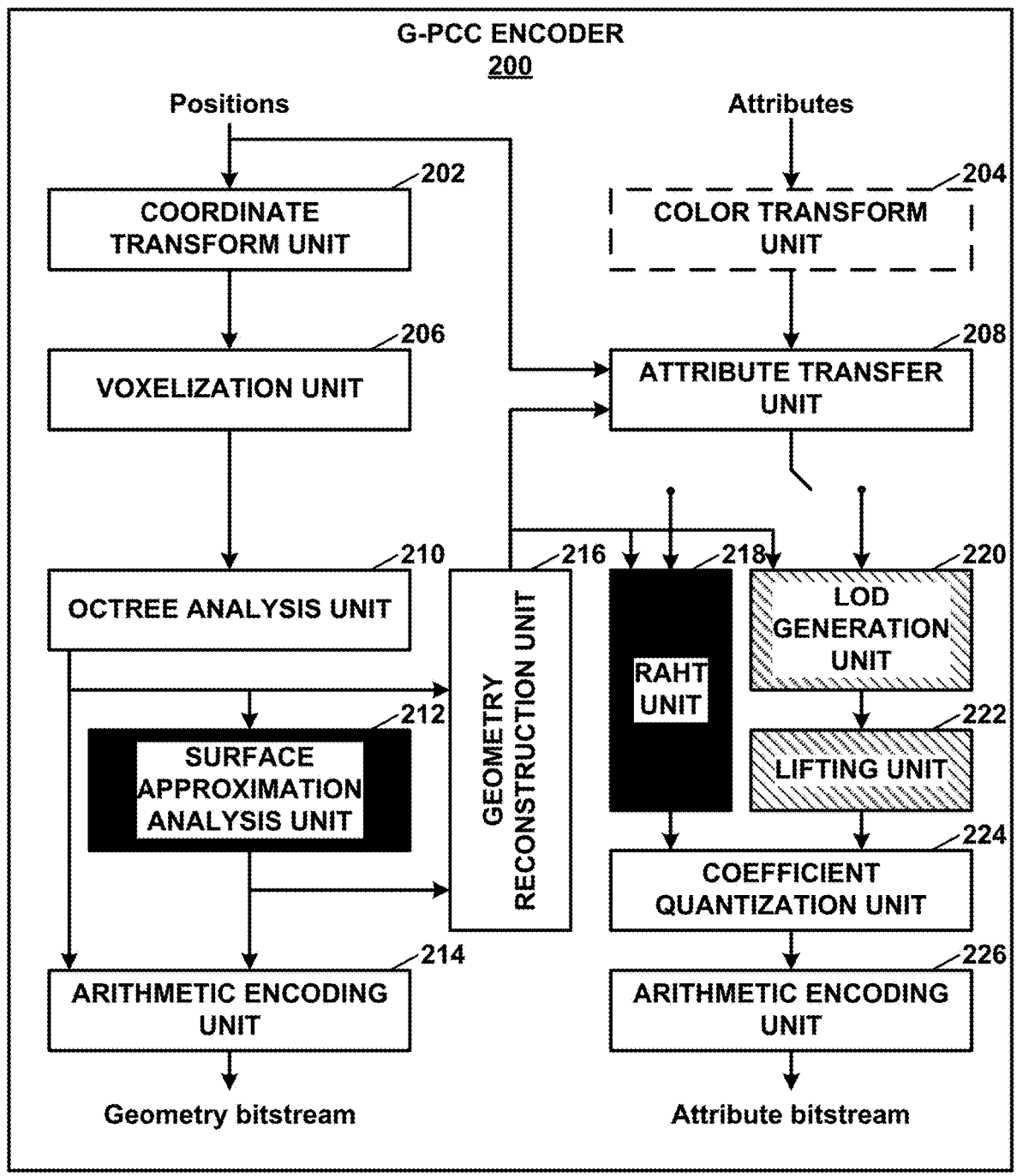
FIG. 2 is a block diagram illustrating an example Geometry Point Cloud Compression (G-PCC) encoder.
Figure 3:
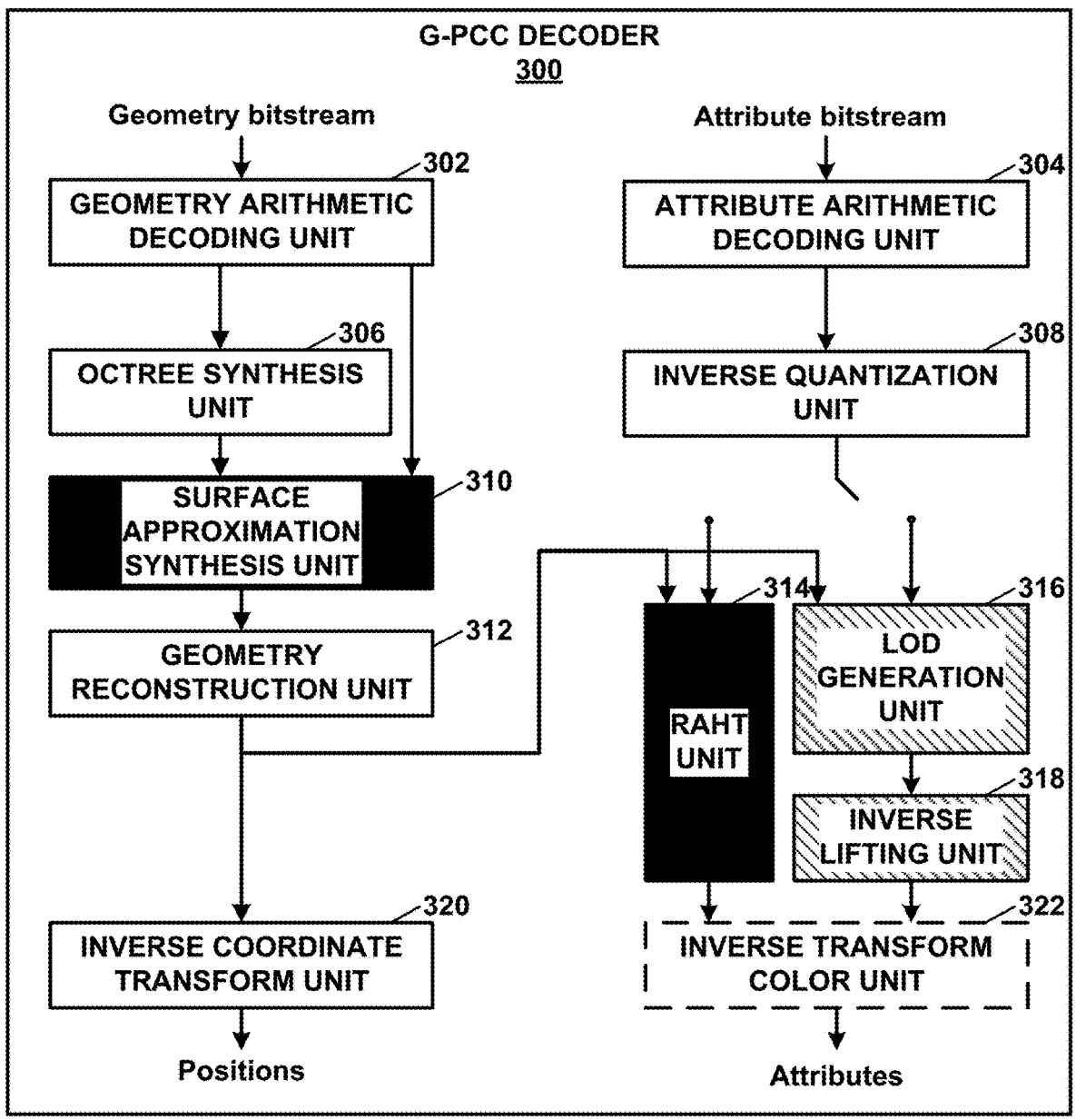
FIG. 3 is a block diagram illustrating an example G-PCC decoder.

FIG. 2 provides an overview of G-PCC encoder 200. FIG. 3 provides an overview of G-PCC decoder 300. The modules shown in FIGS. 2 and 3 are logical, and do not necessarily correspond one-to-one to implemented code in the reference implementation of G-PCC codec, e.g., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3. See G-PCC Future Enhancements, ISO/IEC JTC1/SC29/WG11 w18887, Geneva, Switzerland, October 2019.

For Category 1 and Category 3 data, the compressed geometry is typically represented as an octree from the root all the way down to a leaf level of individual voxels. For some Category 1 data, the compressed geometry may be represented by a pruned octree (e.g., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model (known as Trisoup coding). The surface model used is a triangulation comprising 1-10 triangles per block, resulting in a triangle soup. The geometry coding method that uses the surface approximation is referred to as the Trisoup geometry coding, while the geometry coding method that uses the full-octree model is known as the Octree geometry coding. In typical cases, Trisoup geometry coding may also be used to indicate cases where the octree is partly coded with octree and partly with Trisoup.

At each node of an octree, an occupancy is signaled (when not inferred) for one or more of its child nodes (up to eight nodes). Occupancy refers to whether there is one or more points in the node. Multiple neighborhoods are specified including (a) nodes that share a face with a current octree node, (b) nodes that share a face, edge, or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, a component value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the user (e.g., G-PCC encoder 200) has the option to choose which of the three attribute codecs to use.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residual obtained as the output of the coding methods for the attributes are quantized. The residuals may be obtained by subtracting the component value from a prediction that is derived based on the points in the neighborhood of the current point and based on the component values of points encoded previously. The quantized residual may be coded using context adaptive arithmetic coding.

In accordance with one or more techniques of this disclosure, G-PCC encoder 200 may determine a position of a point of the point cloud and may quantize attribute data for the point. The attribute data for the point may include a first value (e.g., a luma value) and a chroma value (e.g., a chroma value). As part of quantizing the attribute data, G-PCC encoder 200 may encode a first delta region QP value for a first component in a region and encode a second delta region QP value for a second component in the region. G-PCC encoder 200 may be configured to determine and encode separate region QP values for the first and second components. By using a region QP value for the second component that is separate from a region QP value for the first component, G-PCC encoder 200 can provide increased compression and/or reduce consumption of computational resources.

Additionally or alternatively, G-PCC encoder 200 may be configured to encode the QP value for a second component in a slice, layer, or region as an offset from the QP value for a first component in that slice, layer, or region. For example, G-PCC encoder 200 may be configured to encode a syntax element that represents the difference between the first slice QP value and the second slice QP value, between a first layer QP value and the second slice QP value, or between a first region QP value and the second slice QP value. A syntax element that encodes the difference between QP values in a slice, layer, or region may be represented herein as ash_attr_qp_delta_chroma, ash_attr_layer_qp_delta_chroma, or ash_attr_region_qp_delta_chroma.

In octree coding, slices may contain points that belong cuboidal portion of a three-dimensional space (e.g., a three-dimensional rectangle). A "slice" may refer to coded data that contains a number of points that may be encoded or decoded independently. The slice may be part of or an entire coded point cloud frame consisting of a geometry data unit and zero or more corresponding attribute data units. For example, multiple slices may be present in the bitstream. In some cases, the term "slice" may refer to the points that are used to code a slice.

The term "region" may refer to another cuboidal region specified that may be used to indicate a QP offset so that points belong to that region have a particular QP value that includes or is based on a particular QP offset value. Points that belong to the slice but that are outside of the region may have a different QP value than the points inside the region.

The term "layer" may refer to one of a plurality of levels that occurs during the RAHT transform. But for the indication of a QP value, the layer QP may refer to the QP offset of a layer for the RAHT case and "QP offset of level" for the predicting/lifting transform case where there are levels of detail. The levels of detail are another partition of points, but they may not be localized within a region of the slice. Layers in RAHT occur in the transform domain, so the layers can represent the hierarchy of coefficients.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, LODN is obtained by union of RL1, RL2, RLN. In some cases, LOD generation may be followed by a prediction scheme (e.g., predicting transform) where components of attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes (e.g., component values, which may also be referred to as component coefficients). Coefficient quantization unit 224 may quantize the component coefficients generated by RAHT unit 218 or lifting unit 222. For example, coefficient quantization unit 224 may be configured to quantize the coefficients based on QP values for each slice, one or more layers within each slice, and one or more regions within each slice. Coefficient quantization unit 224 can also generate attribute parameter sets and attribute slice headers that include QP values, QP offset values, and delta QP values as described herein. G-PCC encoder 200 can generate and signal syntax elements in the attribute parameter set and in the attribute slice header. Arithmetic encoding unit 226 may apply arithmetic encoding to syntax elements representing the quantized component coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, an LOD generation unit 316, an inverse lifting unit 318, an inverse transform coordinate unit 320, and an inverse transform color unit 322. In accordance with one or more techniques of this disclosure, G-PCC decoder 300 may reconstruct a position of a point of the point cloud and may inverse quantize attribute data for the point. As part of inverse quantizing the attribute data, G-PCC decoder 300 may decode a first delta region QP value for a first component in a region and decode a second delta region QP value for a second component in the region. Using these delta region QP values, G-PCC decoder 300 may be configured to determine separate region QP values for the first and second components. By using a region QP value for the second component that is separate from a region QP value for the first component, G-PCC decoder 300 can provide increased compression and/or reduce consumption of computational resources.

Additionally or alternatively, G-PCC decoder 300 may be configured to determine the QP value for a second component in a slice, layer, or region based on the QP value for a first component in that slice, layer, or region. For example, G-PCC decoder 300 may be configured to decode a syntax element that represents the difference between the first slice QP value and the second slice QP value, between a first layer QP value and the second slice QP value, or between a first region QP value and the second slice QP value.

G-PCC decoder 300 may obtain a geometry bitstream and an attribute bitstream (e.g., from input interface 122 (FIG. 1)). Geometry arithmetic decoding unit 302 of decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize component values. Inverse quantizing a quantized component value for a point may involve multiplying the quantized component value by a QP step size applicable to the point (e.g., a QP step size for the point). The component values may be based on syntax elements obtained from the attribute bitstream (e.g., including syntax elements decoded by attribute arithmetic decoding unit 304). For example, inverse quantization unit 308 may be configured to determine the QP values for the first and second components for a slice, one or more layers, and a region within the slice based on data encoded in the attribute bitstream.

Inverse quantization unit 308 may be configured to determine slice QP values for both components based on syntax elements signaled in an attribute parameter set and an attribute slice header. Inverse quantization unit 308 may be configured to determine layer QP values and one or more region QP values based on syntax elements signaled in the attribute slice header. For example, the attribute slice header may signal two syntax elements indicating the region QP values for each component. The attribute slice header may also signal delta QP values that indicate the QP value for a second component as an offset from a respective QP value for a first component.

Depending on how the component values are encoded, RAHT unit 314 may perform RAHT coding to determine, based on the inverse quantized component values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the component values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the components of an attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the component. When the lifting scheme is used, LOD generation unit 316 may also include an update operator to update the coefficients used to derive the component values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by encoder 200 and decoder 300. The units may be implemented as one or more processors implemented in circuitry, such as fixed-function circuits, programmable circuits, or a combination thereof. Fixed-function circuits refer to circuits that provide particular functionality, and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 4:
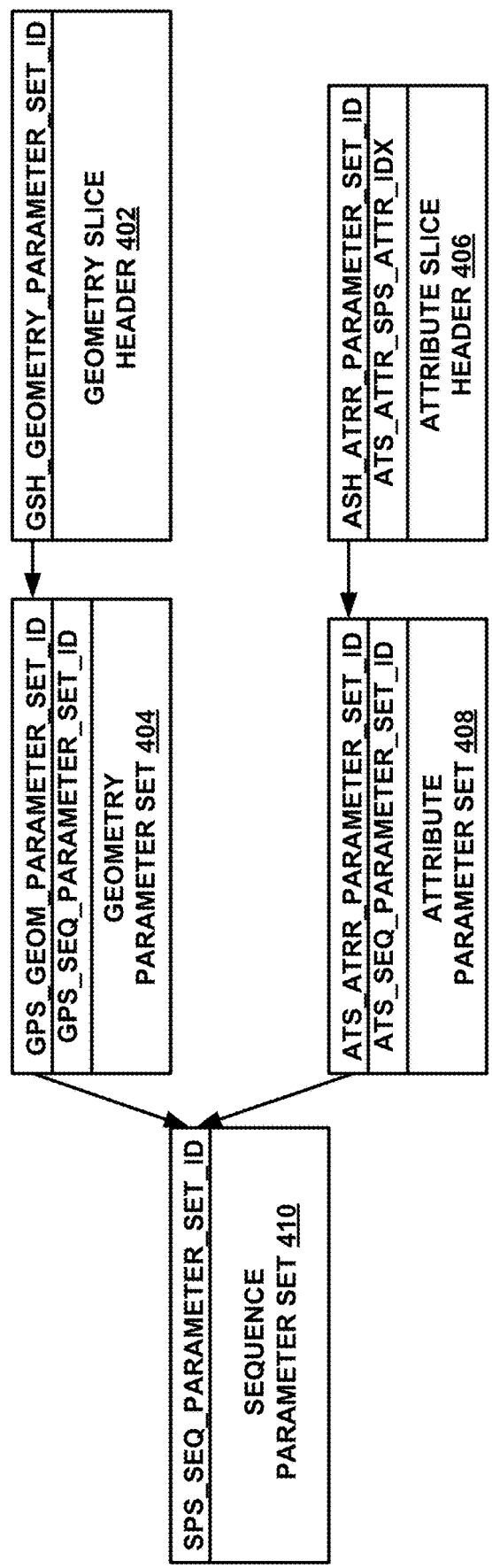
FIG. 4 is a conceptual diagram illustrating a relationship between a sequence parameter set, a geometry parameter set, a geometry slice header, an attribute parameter set, and an attribute slice header.

FIG. 4 is a conceptual diagram illustrating a relationship between a sequence parameter set 410, a geometry parameter set 404, a geometry slice header 402, an attribute parameter set 408, and an attribute slice header 406. G-PCC encoder 200 may use parameter sets, such as sequence parameter set 410, geometry parameter set 404, geometry slice header 402, attribute parameter set 408, and attribute slice header 406, to convey higher-level syntax elements. In other words, the syntax elements in these parameter set may be applicable at a higher level than individual slices, points, or attributes.

As shown in the example of FIG. 4, geometry slice header 402 may refer to geometry parameter set 404, which may in turn refer to sequence parameter set 410. Specifically, geometry slice header 402 includes a syntax element gsh_geometry_parameter_set_id that specifies a value equal to a gps_geom_parameter_set_id syntax element of geometry parameter set 404; geometry parameter set 404 includes a gps_seq_parameter_set_id syntax element that specifies a value equal to a sps_seq_parameter_set_id syntax element of sequence parameter set 410. Attribute slice header 406 may refer to attribute parameter set 408, which in turn may refer to sequence parameter set 410. Specifically, attribute slice header 406 includes a syntax element ash_attr_parameter_set_id that specifies a value equal to an aps_attr_parameter_set_id syntax element of attribute parameter set 408; attribute parameter set 408 includes an aps_seq_parameter_set_id syntax element that specifies a value equal to the sps_seq_parameter_set_id syntax element of sequence parameter set 410.

Attribute coding in G-PCC involves a quantization/inverse-quantization process that enables the codec to trade between the reconstructed quality of the attributes of the point cloud and the bits required to represent them. QP values are used to control this trade-off by determining the particular scaling operations to be performed on the attributes. The QPs are signaled in the bitstream, either as initial QP values, as delta QP values, and/or as QP offset values. For example, G-PCC encoder 200 (e.g., coefficient quantization unit 224) may be configured to encode an initial QP value for a slice in attribute parameter set 408. G-PCC decoder 300 (e.g., inverse quantization unit 308) may be configured to decode and use this initial QP value as the QP value for the slice for the first component. G-PCC encoder 200 may be configured to also encode a QP offset value for the slice, and G-PCC decoder 300 may be configured to decode and use this QP offset value to determine the QP value for the slice for the second component.

G-PCC encoder 200 (e.g., coefficient quantization unit 224) may be configured to encode delta QP values for the slice for the first and second components in attribute slice header 406. G-PCC encoder 200 may be configured to also encode delta QP values for each layer for the first and second components in attribute slice header 406. Furthermore, G-PCC encoder 200 may be configured to encode delta QP values for a region of the slice for the first and second components in attribute slice header 406. G-PCC decoder 300 (e.g., inverse quantization unit 308) may be configured to decode and use these delta QP values to determine the QP values for slice, for each layer, and for one or more regions for the first and second components.

Non-Normative Quantization and Scaling

In some examples, the original point cloud may be represented in a floating point format or at a very high bitdepth. G-PCC encoder 200 may be configured to quantize and voxelize the input point cloud at a certain bitdepth, denoted by the voxelization unit 206 in FIG. 2. A quantization may be applied at G-PCC encoder 200 in voxelization unit 206 for the purpose of voxelization, and a scaling may be performed at G-PCC decoder 300 mainly for the mapping of the decoded point cloud (e.g., in voxels unit) in application specific physical space (e.g., in physical dimension). A scale value that may be used by decoder 300 for this operation is signaled using the syntax elements sp_source_scale_factor_numerator_minus1 and sps_source_scale_factor_denominator_minus1. The quantization process being a pre-processing step (prior to encoding) and the scaling process being a post-processing step (after decoding) does not impact the overall coding process, e.g., they are non-normative in nature.

| | |
|---|---|
| sps_source_scale_factor_numerator_minus1 | ue(v) |
| sps_source_scale_factor_denominator_minus1 | ue(v) |

For purposes of this disclosure, at encoder 200, the point cloud before the non-normative quantization will be referred to as unquantized point cloud and the point cloud after the non-normative quantization will be referred to as the quantized point cloud. This quantization is not related to the quantization that may be done by a G-PCC codec. Similarly, the output of G-PCC decoder 300 is referred to as the quantized point cloud. The output of any non-normative scaling at decoder 300 is referred to as unquantized point cloud. It is again to be noted that the output of G-PCC decoder 300 may be the result of normative scaling operations.

Attribute Quantization

Attribute coding in G-PCC involves a quantization/inverse-quantization process that enables the codec (e.g., encoder 200 and decoder 300) to trade between the reconstructed quality of the attributes of the point cloud and the bits required to represent them. QPs are used to control this trade-off by determining the particular scaling operations to be performed on the attributes. The QPs are signaled in the bitstream.

For attributes, QPs are signaled as follows:
- Initial QP value (aps_attr_initial_qp and aps_attr_chroma_qp_offset) in the Attribute parameter set. aps_attr_initial_qp may represent the initial QP value for all components of an attribute for the slices associated with the attribute parameter set. The initial QP value for a second component may be signaled indirectly (e.g., using aps_attr_chroma_qp_offset) in a quantized bit stream as a QP offset value, rather than as an absolute QP value.
- Delta QP value (ash_attr_qp_delta_luma and ash_attr_qp_delta_chroma) in the Attribute slice header. The initial slice QP value for each component can be signaled indirectly using an initial QP value and one or more respective delta QP values.
- Delta QP value per layer (ash_attr_layer_qp_delta_luma and ash_attr_layer_qp_delta_chroma) in the Attribute slice header. Each slice may include one or more layers, and G-PCC encoder 200 may be configured to encode delta layer QP values for both components as ash_attr_layer_qp_delta_luma and ash_attr_layer_qp_delta_chroma.
- Delta QP value for a region (ash_attr_region_qp_delta) in the slice header. Each slice may include one or more regions that are specified in the attribute slice header. The slice header can signal a delta QP value for a specified region.

The offsets for the luma component (initial qp, delta QP value in ASH and delta layer QP value) are added before determining the quantization/scaling step size. The same applies for chroma (initial qp, APS chroma QP offset, ASH chroma QP offset). When the point belongs to a region specified in the slice header, a further delta QP value may be added to the luma and chroma components. This further delta QP value may be referred to as a "delta region QP value."

The relevant syntax, semantics and the derivation associated with the component QP parameters are listed below.

QP Parameters in the Attribute Parameter Set

|  | Descriptor |
| --- | --- |
| attribute_parameter_set( ) { |  |
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   ... | ... | aps_attr_initial_qp specifies the initial value of the variable SliceQp for each slice referring to the APS. The value of aps_attr_initial_qp shall be in the range of 4 to 51, inclusive.

aps_attr_chroma_qp_offset specifies the offsets to the initial quantization parameter signaled by the syntax aps_attr_initial_qp.

aps_slice_qp_delta_present_flag equal to one specifies that the ash_attr_qp_delta_luma and ash_attr_qp_delta_chroma syntax elements are present in the ASH. aps_slice_qp_present_flag equal to one specifies that the ash_attr_qp_delta_luma and ash_attr_qp_delta_chroma syntax elements are not present in the ASH.

QP Parameters in the Slice Header

|  | Descriptor |
| --- | --- |
| attribute_slice_header( ) { |  |
|   ash_attr_parameter_set_id | ue(v) |
|   ash_attr_sps_attr_idx | ue(v) |
|   ash_attr_geom_slice_id | ue(v) |
|   if ( aps_slice_qp_delta_present_flag ) { |  |
|     ash_attr_qp_delta_luma | se(v) |
|     if( attribute_dimension_minus1[ ash_attr_sps_attr_idx ] > 0 ) |  |
|       ash_attr_qp_delta_chroma | se(v) |
|   } |  |
|   ash_attr_layer_qp_delta_present_flag | u(1) |
|   if ( ash_attr_layer_qp_delta_present_flag ) { |  |
|     ash_attr_num_layer_qp_minus1 | ue(v) |
|     for( i = 0; i < NumLayerQp; i++ ){ |  |
|       ash_attr_layer_qp_delta_luma[i] | se(v) |
|       if( attribute_dimension_minus1[ ash_attr_sps_attr_idx ] > 0 ) |  |
|         ash_attr_layer_qp_delta_chroma[i] | se(v) |
|     } |  |
|   } |  |
|   ash_attr_region_qp_delta_present_flag | u(1) |
|   if ( ash_attr_region_qp_delta_present_flag ) { |  |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_region_qp_delta | se(v) |
|   } |  |
|   byte_alignment( ) |  |
| } |  | ash_attr_layer_qp_delta_present_flag equal to one specifies that the ash_attr_layer_qp_delta_luma and ash_attr_layer_qp_delta_chroma syntax elements are present in current ASH. ash_attr_layer_qp_delta_present_flag equal to zero specifies that the ash_attr_layer_qp_delta_luma and ash_attr_layer_qp_delta_chroma syntax elements are not present in current ASH.

ash_attr_num_layer_qp_minus1 plus one specifies the number of layer in which ash_attr_qp_delta_luma and ash_attr_qp_delta chroma are signaled. When ash_attr_num_layer_qp is not signaled, the value of ash_attr_num_layer_qp is inferred to be zero. The value of NumLayerQp is derived as follows:

NumLayerQp=num_layer_qp_minus1+1 ash_attr_qp_delta_luma specifies the luma delta QP from the initial slice QP in the active attribute parameter set. ash_attr_qp_delta_luma may be referred to as a "delta slice QP value for the first component." When ash_attr_qp_delta_luma is not signaled, the value of ash_attr_qp_delta_luma is inferred to be zero.

ash_attr_qp_delta_chroma specifies the chroma delta QP from the initial slice QP in the active attribute parameter set. ash_attr_qp_delta chroma may be referred to as a "delta slice QP value for the second component." When ash_attr_qp_delta_chroma is not signaled, the value of ash_attr_qp_delta_chroma is inferred to be zero.

The variables InitialSliceQpY and InitialSliceQpC (e.g., the slice QP values) are derived as follows:

InitialSliceQpY=aps_attrattr_initial_qp+ash_attr_qp_delta_luma

InitialSliceQpC=aps_attrattr_initial_qp+aps_attr_chroma_qp_offset+ash_attr_qp_delta_chroma In some examples, G-PCC decoder 300 is configured to determine a first slice QP value from the initial QP value (aps_attr_initial_qp) and the first delta slice QP value (ash_attr_qp_delta_luma). G-PCC decoder 300 may be configured to determine a second slice QP value from the initial QP value (aps_attr_initial_qp), the initial offset QP value (aps_attr_chroma_qp_offset), and the second delta slice QP value (ash_attr_qp_delta_chroma). In some examples, G-PCC decoder 300 may be configured to determine the second slice QP value from a layer or region QP value and the second delta slice QP value.

ash_attr_layer_qp_delta_luma specifies the luma delta QP from the InitialSliceQpY in each layer. When ash_attr_layer_qp_delta_luma is not signaled, the value of ash_attr_layer_qp_delta_luma of all layers are inferred to be zero. ash_attr_layer_qp_delta_luma may be referred to as a "delta layer QP value for the first component."

ash_attr_layer_qp_delta_chroma specifies the chroma delta QP from the InitialSliceQpC in each layer. When ash_attr_layer_qp_delta chroma is not signaled, the value of ash_attr_layer_qp_delta_chroma of all layers are inferred to be zero. ash_attr_layer_qp_delta_chroma may be referred to as a "delta layer QP value for the second component."

G-PCC decoder 300 may be configured to determine the QP values for one or more layers within a slice from the QP values for the slice and the delta layer QP values. The variables SliceQpY[i] and SliceQpC[i] with i=0 . . . NumLayerQPNumQPLayer−1 are derived as follows:

```
for ( i = 0; i < NumLayerQPNumQPLayer; i++) {
  SliceQpY[ i ] = InitialSliceQpY + ash_attr_layer_qp_delta_luma[ i ]
  SliceQpC[ i ] = InitialSliceQpC + ash_attr_layer_qp_delta_chroma[
    i ]
}
```

In some examples, G-PCC decoder 300 is configured to determine a first layer QP value from the first slice QP value (Initial SliceQpY) and the first delta layer QP value (ash_attr_layer_qp_delta_luma). G-PCC decoder 300 may be configured to determine a second layer QP value from the second slice QP value (Initial SliceQpC) and the second delta layer QP value (ash_attr_layer_qp_delta_chroma).

ash_attr_region_qp_delta_present_flag equal to one indicates the ash_attr_region_qp_delta and region bounding box origin and size are present in current ASH. ash_attr_region_qp_delta_present flag equal to zero indicates the ash_attr_region_qp_delta and region bounding box origin and size are not present in current ASH.

ash_attr_qp_region_box_origin_x indicates the x offset of the region bounding box relative to slice_origin_x. When not present, the value of ash_attr_qp_region_box_origin_x is inferred to be zero.

ash_attr_qp_region_box_origin_y indicates the y offset of the region bounding box relative to slice_origin_y. When not present, the value of ash_attr_qp_region_box_origin_y is inferred to be zero.

ash_attr_qp_region_box_origin_z indicates the z offset of the region bounding box relative to slice_origin_z. When not present, the value of ash_attr_qp_region_box_origin_z is inferred to be zero.

The variable RegionboxX, RegionboxY and RegionboxZ specifying the region box origin are set equal to ash_attr_qp_region_box_origin_x, ash_attr_qp_region_box_origin_y and ash_attr_qp_region_box origin_z respectively.

ash_attr_qp_region_box_size_width indicates the width of the region bounding box. When not present, the value of ash_attr_qp_region_box_size_width is inferred to be zero.

ash_attr_qp_region_box_size_height indicates the height of the region bounding box. When not present, the value of ash_attr_qp_region_box_size_height is inferred to be zero.

ash_attr_qp_region_box_size_depth indicates the depth of the region bounding box. When not present, the value of ash_attr_qp_region_box_size_depth is inferred to be zero.

The variable RegionboxWidth, RegionboxHeight and RegionboxDepth specifying the region box size are set equal to ash_attr_qp_region_box_size_width, ash_attr_qp_region_box_size_height and ash_attr_qp_region_box_size_depth respectively.

ash_attr_region_qp_delta specifies the delta region QP value from the layer QP values SliceQpY[i] and SliceQpC[i] (with i=0 . . . NumLayerQPNumQPLayer−1) of the region specified by ash_attr_qp_region_box. In some examples, such as when layers are absent or only one layer/level of detail is present, the delta region QP value may represent the difference between a region QP value and a slice QP value. When not present, the value of ash_attr_region_qp_delta is inferred to be zero.

The variable RegionboxDeltaQp specifying the region box delta quantization parameter is set equal to ash_attr_region_qp_delta. RegionboxDeltaQp may be referred to as the region QP value.

Derivation of Quantization Step Sizes

The quantization step sizes are derived in the following section of an example G-PCC specification. Similar step size derivation is also applied in the RAHT process.

Inverse Quantization Process

Inputs of the inverse quantization process are:
  a variable FixedPointWeightShift specifying the fixed-point representation precision for quantization weights.
  an array of quantization weights quantizationWeights[i], where i is in the range of zero to PointCount−1, inclusive.

The output of the process is:
a series of the unquantized attribute coefficients unquantAttributeCoefficients[i][a], where i is in the range of zero to PointCount−1, inclusive, and a in the range of zero to AttrDim−1, inclusive.
The inverse quantization process proceeds as follows.

```
endIndex = pointCountPerLevelOfDetail[ 0 ]
for (i=0, d = 0; i< PointCount; i++) {
    if ( i == endIndex ) {
        endIndex = pointCountPerLevelOfDetail[ ++d ];
        layerQpY = ( d < NumLayerQP ) ? SliceQpY[ d ] : SliceQpY[
            NumLayerQP − 1
        ];
        layerQpC = ( d < NumLayerQP ) ? SliceQpC[ d ] : SliceQpC[
            NumLayerQP − 1
        ];
    }
    regionBoxDeltaQp = 0;
    if(ash_attr_region_qp_delta_present_flag == 1){
        isPointContainedRegionBox =
            ( RegionboxX <= PointPos[ i ][ 0 ] )
            && ( PointPos[ i ][ 0 ] < ( RegionboxX + RegionboxWidth ) )
            && ( RegionboxY <= PointPos[ i ][ 1 ] )
            && ( PointPos[ i ][ 1 ] < ( RegionboxY + RegionboxHeight ) )
            && ( RegionboxZ <= PointPos[ i ][ 2 ] )
            && ( PointPos[ i ][ 2 ] < ( RegionboxZ + RegionboxDepth ) );
        regionBoxDeltaQp = isPointContainedRegionBox ? RegionboxDeltaQp
            : 0;
    }
    qstepY = QpToQstep( layerQpY + regionBoxDeltaQp, 1 );
    qstepC = QpToQstep( layerQpC + regionBoxDeltaQp, 0 );
    for (a=0; a< AttrDim; a++)
        unquantAttributeCoefficients[ i ][ a ] = residual_values[ a ][ i ] ×
            ( a == 0 ? qstepY : qstepC);
```

RAHT Region-Wise QP Derivation Process

The outputs of the RAHT region-wise QP derivation process are the array PointRegionboxDeltaQp, with entries PointRegionboxDeltaQp[lvl][x][y][z] equal to the value of delta QP per point based on region represented by a coefficient at position (x, y, z) at the lvl'th 1D level of the RAHT transform.

The output array PointRegionboxDeltaQp is initialized to negative one. The variable RegionQpBitShift is set to equal to four.

```
for( i = 0; i < PointCount; i++ ) {
    x = PointPos[ i ][ 0 ]
    y = PointPos[ i ][ 1 ]
    z = PointPos[ i ][ 2 ]
    PointRegionboxDeltaQp[ 0 ][ x ][ y ][ z ] = 0
    if(ash_attr_region_qp_delta_present_flag == 1){
        isPointContainedRegionBox =
            ( RegionboxX <= x )
            && ( x < ( RegionboxX + RegionboxWidth ) )
            && ( RegionboxY <= y )
            && ( y < ( RegionboxY + RegionboxHeight ) )
            && ( RegionboxZ <= z )
            && ( z < ( RegionboxZ + RegionboxDepth ) ) ;
        PointRegionboxDeltaQp[ 0 ][ x ][ y ][ z ] =
            isPointContainedRegionBox ? (RegionboxDeltaQp <<
            RegionQpBitShift): 0;
    }
}
for( lvl = 1, lvl <= (NumRahtLevels − 1) × 3; lvl++){
    for( i = 0; i < PointCount; i++ ) {
        x = PointPos[ i ][ 0 ] >> ( ( lvl + 0 ) / 3 )
        y = PointPos[ i ][ 1 ] >> ( ( lvl + 1 ) / 3 )
        z = PointPos[ i ][ 2 ] >> ( ( lvl + 2 ) / 3 )
        if(PointRegionboxDeltaQp[ lvl ][ x ][ y ][ z ] == −1){
            prevX = (lvl % 3 == 0)? x + 1: x;
            prevY = (lvl % 3 == 2)? y + 1: y;
            prevZ = (lvl % 3 == 1)? z + 1: z;
            lQp = PointRegionboxDeltaQp[ lvl − 1 ][ x ][ y ][ z ];
            rQp = PointRegionboxDeltaQp[ lvl − 1 ][ prevX ][ prevY ][ prevZ
            ];
            if(lQp == −1)
                PointRegionboxDeltaQp[ lvl ][ x ][ y ][ z ] = rQp;
            else if (rQp == −1)
                PointRegionboxDeltaQp[ lvl ][ x ][ y ][ z ] = lQp;
            else
                PointRegionboxDeltaQp[ lvl ][ x ][ y ][ z ] = ((lQp + rQp) >>
                1);
        }
    }
}
```

Scaling Process for RAHT Coefficients
The inputs to the scaling process are:
an n-element array coeff of quantised coefficients
a position (xTn, yTn, zTn) specifying the location of a transform tree node in the RAHT transform tree
a variable lvl indicating the 3D transform level of the coefficients
a variable cIdx specifying the index of an attribute component
The output is an n-element array of scaled transform coefficients d.
The variable qlayer is set equal to Min(NumLayerQP−1, NumRahtLevels−lvl−1).
The scaled transform coefficient $d[i][cIdx]$ with $i=0 \ldots n-1$, and
$cIdx=0 \ldots AttrDim-1$ is derived as follows:

```
for( i = 0, childIdx = 0; childIdx < 8 && i < n; childIdx++ ) {
    ( dx, dy, dz ) = MortonToTuple( childIdx )
    if( Weights[ lvl ][ xTn + dx ][ yTn + dy ][ zTn + dz ] == 0 )
        continue
    deltaRegionQp =
    (PointRegionboxDeltaQp[ lvl ][ xTn + dx ][ yTn + dy ][ zTn + dz ]
        >> RegionQpBitShift)
    qstepY = QpToQstep( SliceQpY[ qlayer ] + deltaRegionQp, 1 )
    qstepC = QpToQstep( SliceQpC[ qlayer ] + deltaRegionQp, 0 )
    for( cIdx = 0; cIdx < AttrDim; cIdx++ )
        d[ i ][ cIdx ] = DivExp2RoundHalfUp( coeff[ i ][ cIdx ] ×
            ( cIdx == 0 ? qstepY : qstepC), 8 )
    i++
}
```

Definition of QpToQstep
Inputs of this process is:
a variable quantization parameter qp.
a variable isFirstComp
The output of the process is a variable quantization step qstep computed as follows:
If (isFirstComp)
qpBdOffset is set equal to
6*(attribute bitdepth minus1_[ash_attr_sps_attr_idx]−7)
otherwise
qpBdOffset is set equal to
6*(attribute secondary bitdepth minus1_[ash_attr_sps_attr_idx]−7)
qp=Clip3(4, 51+qpBdOffset, qp);
qstep=levelScale[qp % 6]<<(qp/6);
Here, the list levelScale[ ] is specified as levelScale [k]={161, 181, 203, 228, 256, 287} with k=0 . . . 5.

Problems and Techniques

One or more techniques described in this disclosure may be applied independently or may be combined in any manner. The term luma component may be used interchangeably with a first component of an attribute or the primary component of an attribute. The term chroma component may be used interchangeably with any component that is not the first component or any component that is a secondary component of an attribute. The term reflectance component may be used interchangeably with any component that is not the first component or any component that is a secondary component of an attribute. The techniques of this disclosure may improve the coding efficiency of a G-PCC encoder and/or G-PCC decoder by improving one or more of QP adaptation for secondary components, the efficiency of using multiple bitdepths for primary and secondary components, and the mapping of QP values for primary and secondary attribute components.

Signaling of Separate Region Chroma Offsets

In one example of the G-PCC specification, only one delta QP value (also called QP offset) is signaled for regions in the slice header. This QP value may be represented by the syntax element ash attr_region_qp_delta. This delta region QP value is used both for luma and chroma samples that belong to the region. For some content, using the same QP offset value (e.g., delta region QP) for luma and chroma may not be sufficient to optimally capture the spatial variation in the content. Typically, different QP values are used to code regions with different spatial characteristics. For some cases, the luma and the chroma characteristics may not be the same in some regions.

In view of this drawback, this disclosure proposes that G-PCC encoder 200 be configured to signal an additional QP offset term for the attribute slice regions that is applied for secondary components (e.g., chroma components). Thus, instead of signaling just one delta region QP value for both components, G-PCC encoder 200 may be configured to separately signal a delta region QP values for each component. G-PCC decoder 300 may be configured to receive and decode this additional QP offset term and use the additional QP offset term for chroma components.

More generally, G-PCC encoder 200 may be configured to signal one or more additional QP offset terms for attribute slice regions, where the additional QP offset terms are applied to one or more secondary component dimensions. Thus, G-PCC decoder 300 may be configured to decode a first delta region QP value for the first component (e.g., ash_attr_region_qp_delta_luma) and separately decode a second delta region QP value for the second component (e.g., ash_attr_region_qp_delta_chroma).

In another example, one or more QP offset terms signaled in the region offset are delta coded with another QP offset term signaled for the region. For example, a second delta region QP value may represent the offset of the second region QP value from a first region QP value or may represent the offset of the second region QP value from a second slice QP value or second layer QP value. G-PCC decoder 300 may be configured to determine a second region QP value by adding the second delta region QP value to the first region QP value, second slice QP value, or second layer QP value.

In general, G-PCC encoder 200 and G-PCC decoder 300 may be configured to code (e.g., encode and signal, and receive and decode, respectively) one or more QP offset terms for one or more secondary components (e.g., chroma components) of a region of a point cloud. G-PCC encoder 200 and G-PCC decoder 300 may code the secondary components of the region of the point cloud using the one or more QP offset terms.

In the following example, an additional chroma QP offset term is signaled for a region. Changes relative to a recent G-PCC specification are shown between the brackets <ADD> and </ADD> for additions and between the brackets <DEL> and </DEL> for deletions.

| | Descriptor |
|---|---|
| attribute_slice_header( ) { | |
|   ash_attr_parameter_set_id | ue(v) |
|   ash_attr_sps_attr_idx | ue(v) |
|   ash_attr_geom_slice_id | ue(v) |
|   if ( aps_slice_qp_delta_present_flag ) { | |
|     ash_attr_qp_delta_luma | se(v) |
|     if( attribute_dimension_minus1[ ash_attr_sps_attr_idx ] > 0 ) | |
|       ash_attr_qp_delta_chroma | se(v) |
|   }0 | |
|   ash_attr_layer_qp_delta_present_flag | u(1) |
|   if ( ash_attr_layer_qp_delta_present_flag ) { | |
|     ash_attr_num_layer_qp_minus1 | ue(v) |
|     for( i = 0; i < NumLayerQp; i++ ){ | |
|       ash_attr_layer_qp_delta_luma[i] | se(v) |
|       if( attribute_dimension_minus1[ ash_attr_sps_attr_idx ] >0 ) | |
|         ash_attr_layer_qp_delta_chroma[i] | se(v) |
|     } | |
|   } | |
|   ash_attr_region_qp_delta_present_flag | u(1) |
|   if ( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     <ADD> ash_attr_region_qp_delta_luma</ADD> | se(v) |
|     <ADD> if( attribute_dimension_minus1[ ash_attr_sps_attr_idx ] > 0 ) </ADD> | |
|       <ADD> ash_attr_region_qp_delta_chroma</ADD> | <ADD>se(v) |

| | Descriptor |
|---|---|
| | </ADD> |

```
  }
  byte_alignment( )
}
```

<ADD>ash_attr_region_qp_delta_luma</ADD> specifies the delta region QP value from the SliceQpY[i]<DEL> and SliceQpC[i]</DEL> (with i=0 . . . NumLayerQPNumQPLayer−1) of the region specified by ash_attr_qp_region_box. In some examples, such as when layers are absent or only one layer/level of detail is present, a delta region QP value may represent the difference between a region QP value and a slice QP value. When not present, the value of <ADD>ash_attr_region_qp_delta_luma</ADD> is inferred to be zero.

<ADD>ash_attr_region_qp_delta_chroma specifies the delta region QP value from the SliceQpC[i] (with i=0 . . . NumLayerQPNumQPLayer−1) of the region specified by ash_attr_qp_region_box. In some examples, a delta region QP value may represent the difference between a region QP value and a slice QP value. When not present, the value of ash_attr_region_qp_delta_chroma is inferred to be zero.</ADD>

The variable <ADD>RegionboxDeltaQpLuma and RegionDeltaQpChroma</ADD> specifying the region box delta quantization parameter is set equal to <ADD>ash_attr_region_qp_delta_luma and ash_attr_region_qp_delta_chroma. </ADD>

The value of RegionDeltaQpChroma is used for calculating the scaling step size for chroma component with the point/coefficient is inside the region.

For generalization of semantics, *_qp_delta_luma and *_qp_delta_chroma can also be referred to as *_qp_delta and *_qp_delta_secondary, in other examples.

The derivation of the RAHT region-wise QP is modified as follows. Changes relative to a recent G-PCC specification are shown between the brackets <ADD> and </ADD> for additions and between the brackets <DEL> and </DEL> for deletions.

RAHT Region-Wise QP Derivation Process

The outputs of this process are the array PointRegionboxDeltaQp, with entries PointRegionboxDeltaQp[lvl][x][y][z]<ADD>[idx]</ADD> equal to the value of delta QP per point based on region represented by a coefficient at position (x, y, z) <ADD> for the idx-th component (zero for luma/primary component, one for chroma or secondary component)</ADD> at the lvl'th 1D level of the RAHT transform.

The output array PointRegionboxDeltaQp is initialized to negative one. The variable RegionQpBitShift is set to equal to four.

```
    <ADD> numComp = AttrDim == 1 ? 1 : 2</ADD>
for( i = 0; i < PointCount; i++ ) {
  x = PointPos[ i ][ 0 ]
  y = PointPos[ i ][ 1 ]
  z = PointPos[ i ][ 2 ]
  PointRegionboxDeltaQp[ 0 ][ x ][ y ][ z ] <ADD> [ 0 ] </ADD> = 0
  <ADD> if(numComp >1) </ADD>
    <ADD> PointRegionboxDeltaQp[ 0 ][ x ][ y ][ z ][ 1 ] = 0</ADD>
  if(ash_attr_region_qp_delta_present_flag == 1){
    isPointContainedRegionBox =
      ( RegionboxX <= x )
```

```
      && ( x < ( RegionboxX + RegionboxWidth ) )
      && ( RegionboxY <= y )
      && ( y < ( RegionboxY + RegionboxHeight ) )
      && ( RegionboxZ <= z )
      && ( z < ( RegionboxZ + RegionboxDepth ) ) ;
    PointRegionboxDeltaQp[ 0 ][ x ][ y ][ z ] <ADD> [ 0 ] </ADD> =
      isPointContainedRegionBox ? (RegionboxDeltaQp<ADD>
        Luma</ADD> <<
  RegionQpBitShift): 0;
    <ADD> if (numComp >1)
      PointRegionboxDeltaQp[ 0 ][ x ][ y ][ z ][ 1 ] =
        isPointContainedRegionBox ? (RegionboxDeltaQpChroma <<
  RegionQpBitShift): 0; </ADD>
  }
}
for( lvl = 1, lvl <= (NumRahtLevels − 1) × 3; lvl++){
  for( i = 0; i < PointCount; i++ ) {
    x = PointPos[ i ][ 0 ] >> ( ( lvl + 0 ) / 3 )
    y = PointPos[ i ][ 1 ] >> ( ( lvl + 1 ) / 3 )
    z = PointPos[ i ][ 2 ] >> ( ( lvl + 2 ) / 3 )
<ADD> for( idx = 0; idx < numComp; idx++ ) {</ADD>
    if(PointRegionboxDeltaQp[ lvl ][ x ][ y ][ z ] <ADD> [ idx ]
      </ADD> == −1){
      prevX = (lvl % 3 == 0)? x + 1: x;
      prevY = (lvl % 3 == 2)? y + 1: y;
      prevZ = (lvl % 3 == 1)? z + 1: z;
      lQp = PointRegionboxDeltaQp[ lvl − 1 ][ x ][ y ][ z ] <ADD> [
        idx ]
</ADD>;
      rQp = PointRegionboxDeltaQp[ lvl − 1 ][ prevX ][ prevY ][ prevZ
        ]
<ADD> [ idx ] </ADD>;
      if(lQp == −1)
        PointRegionboxDeltaQp[ lvl ][ x ][ y ][ z ] <ADD> [ idx ]
</ADD> = rQp;
      else if (rQp == −1)
        PointRegionboxDeltaQp[ lvl ][ x ][ y ][ z ] <ADD> [ idx ]
</ADD> = lQp;
      else
        PointRegionboxDeltaQp[ lvl ][ x ][ y ][ z ] = ((lQp + rQp)
          >> 1);
    }
  }
}
```

Signaling of Secondary Bitdepth

In an example G-PCC specification, the bitdepth for primary and secondary components of an attribute are signaled in a sequence parameter set (SPS) as follows:

| | Descriptor |
|---|---|
| seq_parameter_set( ) { | |
|   main_profile_compatibility_flag | u(1) |
|   reserved_profile_compatibility_2bits | u(22) |
| [Ed. assign bits from this when there is a profile defined] | |
|   unique_point_positions_constraint_flag | u(1) |
|   level_idc | u(8) |
|   sps_seq_parameter_set_id | ue(v) |
|   ... | |
|   sps_num_attribute_sets | ue(v) |
|   for( i = 0; i< sps_num_attribute_sets; i++ ) { | |
|     attribute_dimension_minus1[ i ] | ue(v) |
|     attribute_instance_id[ i ] | ue(v) |
|     attribute_bitdepth_minus1[ i ] | ue(v) |

-continued

| | Descriptor |
|---|---|
| if(attribute_dimension_minus1[ i ] > 0 ) | |
|     attribute_secondary_bitdepth_minus1[ i ] | ue(v) |
| attribute_cicp_colour_primaries[ i ] | ue(v) |
| attribute_cicp_transfer_characteristics[ i ] | ue(v) | attribute_bitdepth_minus1[i] plus one specifies the bit-depth for first component of the i-th attribute signal(s).

attribute_secondary_bitdepth_minus1[i] plus one specifies the bitdepth for secondary component of the i-th attribute signal(s).

The first component/dimension of the attribute is also referred to as the primary component/dimension, and the rest of the components/dimensions are referred to as a secondary component/dimension. The signaling in an example G-PCC specification allows the bitdepth for the secondary attribute dimensions to be independent of the primary dimensions. A secondary bitdepth different from primary bitdepth may be useful for coding content in a YCoCg colour space at a lossless condition, because the bitdepth of the chroma components increases by one in such cases (e.g., see S. Yea, A. Vosoughi, S. Liu, *Lossless color transform for attribute coding*, m49601, Gothenberg, Sweden, July 2019). The impact of supporting multiple bitdepths is not trivial in terms of the resources required to implement the codec, more so for the case of hardware implementations. It may be beneficial to only restrict the flexibility in the bitdepth in cases where a use case is known. It may be over-burdening on implementations to support all possible bitdepth combinations.

This disclosure proposes to remove the signaling of secondary bitdepth, and instead signal a flag that specifies whether the bitdepth of the secondary component is one more than the bitdepth of the primary component. The flag may include a single bit that is signaled in the sequence parameter set. Thus, G-PCC decoder 300 may be configured to determine whether the bitdepth value for the second component is equal to or one bit longer than the bitdepth value for the first component.

In one example, the value of the flag may be constrained such that the secondary bitdepth does not exceed the maximum bitdepth value (e.g., if the maximum bitdepth supported is 16, the value of the flag shall not be equal to one when the primary bitdepth is 16).

In another example, G-PCC encoder 200 and G-PCC decoder 300 may operate according to a constraint that the value of secondary bitdepth of a component is equal to the bitdepth of the primary component or equal to the value of the bitdepth of the primary component plus one (e.g., if primary bitdepth is x, the secondary bitdepth may be x or x+1). G-PCC decoder 300 can set the bitdepth of the second component equal to a maximum bitdepth regardless of a value of the flag in response to determining that the bitdepth of the first component is greater than or equal to the maximum bitdepth.

In another example, G-PCC encoder 200 and G-PCC decoder 300 may operate according to a constraint that the value of secondary bitdepth of a component is less than or equal to the value of the bitdepth of the primary component plus one. The bitdepth of the second component may be constrained to be equal to the bitdepth of the first component or equal to the bitdepth of the first component plus one.

In another example, G-PCC encoder 200 and G-PCC decoder 300 may operate according to a constraint that the value of the secondary bitdepth of the component is different from the primary bitdepth only when the colour space used for coding is YCoCg-R; additionally, the constraint may further restrict the value of the secondary bitdepth to be one more than the value of the primary bitdepth in such cases.

In another example, G-PCC encoder 200 may be configured to signal a flag to indicate that the primary bitdepth is different from the secondary bitdepth. For example, the flag indicates that the secondary bitdepth is different.

In one example, the secondary bitdepth is derived based on pre-determined steps from the primary bitdepth (e.g., set equal to one more than the value of primary bitdepth); otherwise, the secondary bitdepth is set equal to the primary bitdepth. The predetermined steps may include zero or one bit longer than the primary bitdepth, or the predetermined steps may include zero or one bit shorter than the primary bitdepth.

In another example, a syntax element specifies the delta-coded value of the secondary bitdepth (delta coded with respect to the primary bitdepth). The delta-coded value may be positive, zero or negative.

In view of the foregoing, G-PCC encoder 200 and G-PCC decoder 300 may be configured to perform one or more of the following techniques. In one example, G-PCC encoder 200 and G-PCC decoder 300 may be configured to code (e.g., encode or decode, respectively) a flag that indicates whether a bitdepth of a secondary component of point cloud data is more than a bitdepth of a primary component of the point cloud data, and code the point cloud data in accordance with the flag. In one example, the secondary component is one or more chroma components of the point cloud data, and wherein the primary component is a luma component of the point cloud data.

In another example, G-PCC encoder 200 and G-PCC decoder 300 may be configured to constrain the value of the flag such that the bitdepth of the secondary component does not exceed a maximum bitdepth.

In another example, G-PCC encoder 200 and G-PCC decoder 300 may be configured to constrain the bitdepth of the secondary component to be equal to the bitdepth of the primary component or equal to the bitdepth of the primary component plus one.

In another example, G-PCC encoder 200 and G-PCC decoder 300 may be configured to constrain the bitdepth of the secondary component to be less than or equal to the bitdepth of the primary component plus one. In response to determining that the bitdepth of the primary component is greater than or equal to the maximum bitdepth of the secondary component, G-PCC decoder 300 may be configured to set the bitdepth of the secondary component equal to the maximum bitdepth of the secondary component regardless of the value of the flag.

In another example, G-PCC encoder 200 and G-PCC decoder 300 may be configured to constrain the bitdepth of the secondary component to be different from the bitdepth of the primary component only when the color space of the point cloud data is YCoCg-R.

In another example, G-PCC encoder 200 and G-PCC decoder 300 may be configured to constrain the bitdepth of the secondary component to always be different from the bitdepth of the primary component when the color space of the point cloud data is YCoCg-R.

In another example, the flag indicates that the bitdepth of the secondary component is different than the bitdepth of the primary component. In this example, G-PCC encoder 200 and G-PCC decoder 300 may be configured to determine the bitdepth of the secondary component based on a pre-determined number of steps away from the bitdepth of the primary component.

In another example, the flag indicates that the bitdepth of the secondary component is different than the bitdepth of the primary component. In this example, G-PCC encoder 200 and G-PCC decoder 300 may be configured code a syntax element specifying a delta-coded value of the bitdepth of the secondary component relative to the primary component.

In the example below, the signaling of the secondary bitdepth is modified relative to an example G-PCC specification. Changes relative to a recent G-PCC specification are shown between the brackets <ADD> and </ADD> for additions and between the brackets <DEL> and </DEL> for deletions.

|  | Descriptor |
|---|---|
| seq_parameter_set( ) { |  |
|   main_profile_compatibility_flag | u(1) |
|   reserved_profile_compatibility_2bits | u(22) |
| [Ed. assign bits from this when there is a profile defined] |  |
|   unique_point_positions_constraint_flag | u(1) |
|   level_idc | u(8) |
|   sps_seq_parameter_set_id | ue(v) |
|   ... |  |
|   sps_num_attribute_sets | ue(v) |
|   for( i = 0; i< sps_num_attribute_sets; i++ ) { |  |
|     attribute_dimension_minus1[ i ] | ue(v) |
|     attribute_instance_id[ i ] | ue(v) |
|     attribute_bitdepth_minus1[ i ] | ue(v) |
|     if(attribute_dimension_minus1[ i ] > 0 ) |  |
| <DEL> attribute_secondary_bitdepth_minus1[ i ]</DEL> | <DEL>ue(v)</DEL> |
|       <ADD> attribute_secondary_modify_bitdepth_flag[ i ]</ADD> | <ADD>u(l)</ADD> |
|     attribute_cicp_colour_primaries[ i ] | ue(v) |
|     attribute_cicp_transfer_characteristics[ i ] | ue(v) | attribute_bitdepth_minus1[i] plus one specifies the bitdepth for first component of the i-th attribute signal(s).

<DEL> attribute_secondary_bitdepth_minus1[i] plus one specifies the bitdepth for secondary component of the i-th attribute signal(s). </DEL>

<ADD> attribute_secondary_modify_bitdepth_flag[i] specifies whether the secondary bitdepth is different from the bitdepth of the first component of the i-th attribute. </ADD>

<ADD> The variable attribute secondary_bitdepth_minus [i] is derived as follows:

attribute secondary bitdepth minus1[i]=attribute bitdepth minus1[i]+attribute secondary modify bitdepth flag[i]? 1:0</ADD>

In another example, the following constraint may be added to the specification.

The value of attribute_secondary_bitdepth_minus1[i] shall be equal to attribute_bitdepth_minus1[i] or attribute bitdepth minus1[i]+1.

Mapping Between OP Values of Primary and Secondary Attribute Components

The QP values for luma and chroma (or in other words, primary and secondary component components) are signaled in an attribute parameter set (APS) and an attribute slice header. The initial QP value for chroma in the APS is delta-coded with respect to the initial QP value for luma in the APS. G-PCC decoder 300 can determine an initial chroma QP value by, for example, summing aps_attr_initial_qp and aps_attr_chroma_qp_offset. In a recent G-PCC specification, all other chroma QP offsets are delta-coded with respect to the initial chroma QP value. This applies to the slice QP offset values (e.g., delta slice QP values) and the layer QP offset values (e.g., delta layer QP values).

Typically, the QP value used for chroma components is very closely related to that of the luma component. In several cases, the QP value of luma may be identical to the QP value used for the chroma component. In video coding standards, a mapping relation between luma and the chroma QPs are applied. Such a mapping enables a very good prediction for the QP of chroma components. Chroma QP offsets (at sequence level, slice level, or block-level) are all signaled with respect to that predicted chroma QP value. This is also useful for coding high-dynamic range content.

The per-layer QP offsets are signaled for both luma and chroma. In typical cases, it is quite likely that the luma QP offset for a layer will also be applicable to the chroma components. However, to support all cases, it may be still beneficial to signal separate chroma offsets at multiple levels. Using a mapping may reduce the number of bits for signaling the chroma QP values.

Even if an explicit mapping is not used, it may be preferable to derive all chroma QP values starting from the luma value applicable to a point or coefficient to reduce the need to signal chroma QP offsets in typical cases.

In one example, this disclosure proposes modifying the derivation of the second QP values for a second component such that the offset values for the second component (e.g., a chroma component) are signaled with respect to the first QP value for the first component that is derived. The first QP value may be determined from one or more of the initial QP value and the delta QP values signaled in the various regions, slice headers, and parameter sets.

As such, G-PCC encoder 200 and G-PCC decoder 300 may be configured to derive a QP prediction for the second component from the QP value for the first component. In some examples, a clipped value of a first QP value for the first component (e.g., based on minimum and maximum allowed first QP value) may be used to derive the second QP value for the second component. G-PCC decoder 300 may be configured to determine the second QP value based on the clipped version of the first QP value. The clipped QP value may be constrained within maximum value and a minimum value for the first component.

A syntax element (e.g., a flag) may be signaled to specify that a mapping table may be explicitly used for mapping QP values for the first component to a QP value for the second component. When not explicitly signaled, G-PCC decoder 300 may be configured to use a default function/table (e.g., linear mapping with slope of one) for mapping the QP values. In some examples, G-PCC decoder 300 is configured to det or generate the mapping table based on decoding the syntax element. For example, G-PCC decoder 300 may be configured to select one of a plurality of predefined mapping tables based on a value of the syntax element.

In another example, G-PCC encoder 200 and G-PCC decoder 300 may be configured to use a mapping table/look-up table or a (parameterized) non-linear function to derive the QP prediction for the second component from the QP value for the first component.

In some examples, one or more parameters associated with the mapping table/function may be signaled or fixed/pre-determined.

In another example, a set of mapping tables may be specified (pre-determined or signaled) and an index to the mapping table used may be signaled in a parameter set (SPS, APS, etc.), slice header, or some other parts of the bitstream.

In another example, a flag may be signaled in a parameter set (SPS, APS, etc.), slice header or the bitstream to specify whether explicit QP information (e.g., QP offsets) is specified for one or more secondary components of an attribute. When not explicitly signaled, default values (e.g., zero) may be inferred for the secondary QP offset values. G-PCC decoder 300 may be configured to decode a syntax element that indicates if QP offset values for the second component are explicitly signaled in the point cloud data. In response to determining that the syntax element indicates that the QP offset values for the second component are explicitly signaled, G-PCC decoder 300 may be configured to decode the QP offset value for the second component. In response to determining that the syntax element indicates that offset values for the second component are not explicitly signaled in the point cloud data, G-PCC decoder 300 may be configured to set the QP offset value to a default value.

In view of the foregoing, G-PCC decoder 300 may be configured to determine a first QP value, determine a QP offset value for the second component, and determine a QP value for the second component from the QP value for the first component and the QP offset value for the second component.

In one example, G-PCC decoder 300 may be configured to determine the first QP value from an initial QP value and a QP offset value for the first component.

In another example, G-PCC decoder 300 may be configured to determine a second QP offset value from a mapping table.

In another example, G-PCC decoder 300 may be configured to decode a syntax element that specifies the mapping table. For example, G-PCC decoder 300 can select one of a plurality of predefined mapping tables based on a value of the syntax element.

In another example, G-PCC decoder 300 may be configured to decode a syntax element that indicates if QP offset values for the second component are explicitly signaled.

Example 1

The derivation of the QP values are modified relative to an example G-PCC specification such that the QP values for the second component are calculated from the QP value for the first component after applying one or more QP offsets for the first component. No explicit mapping is applied in this example. In the following example, an additional QP offset term for the second component is signaled in the region. Changes relative to a recent G-PCC specification are shown between the brackets <ADD> and </ADD> for additions and between the brackets <DEL> and </DEL> for deletions.

ash_attr_qp_delta_chroma specifies the chroma delta QP from the initial slice QP in the active attribute parameter set. When ash_attr_qp_delta_chroma is not signaled, the value of ash_attr_qp_delta_chroma is inferred to be zero. The variables InitialSliceQpY and InitialSliceQpC are derived as follows:

Initial SliceQpY=aps_attrattr_initial_qp+ash_attr_qp_delta_luma

<ADD> Initial SliceQpOffsetC</ADD>=<DEL>aps_attrattr_initial_qp+</DEL> aps_attr_chroma_qp_offset+ash_attr_qp_delta_chroma ash_attr_layer_qp_delta_luma specifies the luma delta QP from the InitialSliceQpY in each layer. When ash_attr_layer_qp_delta_luma is not signaled, the value of ash_attr_layer_qp_delta_luma of all layers are inferred to be zero.

ash_attr_layer_qp_delta_chroma specifies the chroma delta QP from the <ADD> InitialSliceQpOffsetC</ADD> in each layer. When ash_attr_layer_qp_delta_chroma is not signaled, the value of ash_attr_layer_qp_delta_chroma of all layers are inferred to be zero.

---

The variables SliceQpY[ i ] and <ADD> SliceQpOffsetC[ i ] </ADD> with i = 0...NumLayerQPNumQPLayer − 1 are derived as follows:
```
for ( i = 0; i < NumLayerQPNumQPLayer; i++) {
    SliceQpY[ i ] = InitialSliceQpY +
    ash_attr_layer_qp_delta_luma[ i ]
    <ADD> SliceQpOffsetC[ i ] = InitialSliceQpOffsetC </ADD> +
ash_attr_layer_qp_delta_chroma[ i ]
}
```

---

The changes to the derivation process for RAHT are as follows:

Scaling Process for RAHT Coefficients

The inputs to this process are:

an n-element array coeff of quantised coefficients a position (xTn, yTn, zTn) specifying the location of a transform tree node in the RAHT transform tree a variable lvl indicating the 3D transform level of the coefficients a variable cIdx specifying the index of an attribute component The output is an n-element array of scaled transform coefficients d. The variable qlayer is set equal to Min (NumLayerQP−1, NumRahtLevels−lvl−1). The scaled transform coefficient d[i][cIdx] with i=0 . . . n−1, and cIdx=0 . . . AttrDim−1 is derived as follows:

---

```
for( i = 0, childIdx = 0; childIdx < 8 && i < n; childIdx++ ) {
    ( dx, dy, dz) = MortonToTuple( childIdx )
    if( Weightsf[ lvl ][ xTn + dx ][ yTn + dy ][ zTn + dz ] = = 0 )
      continue
    deltaRegionQp =
(PointRegionboxDeltaQp[ lvl ][ xTn + dx ][ yTn + dy ][ zTn + dz ]
        >> RegionQpBitShift)
    qstepY = QpToQstep( SliceQpY[ qlayer ] + deltaRegionQp, 1 )
    qstepC = QpToQstep( <ADD> SliceQpY[ qlayer ] +
    SliceQpOffsetC[ qlayer ]
```

```
</ADD> + deltaRegionQp, 0 )
   for( cIdx = 0; cIdx < AttrDim; cIdx++ )
     d[ i ][ cIdx ] = DivExp2RoundHalfUp( coeff[ i ][ cIdx ] ×
       ( cIdx == 0 ? qstepY : qstepC), 8 )
   i++
}
```

The changes to the inverse quantization process is as follows:

Inverse Quantization Process

Inputs of this process are:

a variable FixedPointWeightShift specifying the fixed-point representation precision for quantization weights.

an array of quantization weights quantizationWeights[i], where i is in the range of zero to PointCount−1, inclusive.

The output of the process is a series of the unquantized attribute coefficients unquantAttributeCoefficients[i][a], where i is in the range of zero to PointCount−1, inclusive, and a in the range of zero to AttrDim−1, inclusive.

The inverse quantization process proceeds as follows.

```
endIndex = pointCountPerLevelOfDetail[ 0 ]
for (i=0, d = 0; i< PointCount; i++) {
   if ( i == endIndex ) {
     endIndex = pointCountPerLevelOfDetail[ ++d ];
     layerQpY = ( d < NumLayerQP ) ? SliceQpY[ d ] :
SliceQpY[ NumLayerQP − 1 ];
     <ADD> layerQpOffsetC </ADD> = ( d < NumLayerQP )
       ?
<ADD> SliceQpOffsetC[ d ] : SliceQpOffsetC[ NumLayerQP − 1 ]
</ADD>;
   }
   regionBoxDeltaQp = 0;
   if(ash_attr_region_qp_delta_present_flag == 1){
     isPointContainedRegionBox =
     ( RegionboxX <= PointPos[ i ][ 0 ] )
       && ( PointPos[ i ][ 0 ] < ( RegionboxX + RegionboxWidth ) )
       && ( RegionboxY <= PointPos[ i ][ 1 ] )
       && ( PointPos[ i ][ 1 ] < ( RegionboxY + RegionboxHeight ) )
       && ( RegionboxZ <= PointPos[ i ][ 2 ] )
       && ( PointPos[ i ][ 2 ] < ( RegionboxZ + RegionboxDepth ) );
   regionBoxDeltaQp = isPointContainedRegionBox ? RegionboxDeltaQp
: 0;
   }
   qstepY = QpToQstep( layerQpY + regionBoxDeltaQp, 1 );
   qstepC = QpToQstep( <ADD> layerQpY + layerQpOffsetC</ADD> +
regionBoxDeltaQp, 0 );
   for (a=0; a< AttrDim; a++)
     unquantAttributeCoefficients[ i ][ a ] = residual_values[ a ][ i ] ×
( a == 0 ? qstepY : qstepC);
}
```

In some alternatives, a mapping function/table may be used to map the luma QP values to chroma QP values. G-PCC decoder 300 may be configured to determine a QP offset value by applying a luma QP value to a mapping table. G-PCC decoder 300 can then determine a chroma QP value from the QP offset value, or G-PCC decoder 300 can determine the chroma QP value directly from the mapping table after applying the luma QP value. For example, if LumaQpToChromaQp[q] is the mapping function table, the following changes are made in the qstepC above. In the RAHT process, the change is as follows:

qstepC=QpToQstep<ADD>(LumaQpToChromaQp [SliceQpY[qlayer]+deltaRegionQp]+SliceQpOffsetC [qlayer], </ADD>0)

In the inverse quantization process, the change is as follows:

qstepC=QpToQstep(<ADD>LumaQpToChromaQp[layerQpY+regionBoxDeltaQp])+layerQpOffsetC, </ADD>0);

Example 2

A mapping function may be signaled for each attribute to map the luma QP value to the chroma QP value.

| | Descriptor |
|---|---|
| attribute_parameter_set( ) { | |
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   <ADD> aps_luma_chroma_mapping_present_flag | u(1) |
|   if( aps_luma_chroma_mapping_present_flag ) | |
|     num_qp_ranges_minus1 | ue(v) |
|     for( i = 0; i <= num_qp_ranges_minus1 ; i++ ) { | |
|       delta_qp_in_range_minus1[ i ] | ue(v) |
|       delta_qp_out_range[ i ] | ue(v) |
|     } | |
| }</ADD> | |
| ... | | aps_luma_chroma_mapping_present_flag equal to one specifies that an explicit mapping table is signaled for mapping for luma to chroma QP values. aps_luma_chroma_mapping_present_flag equal to zero specifies that explicit mapping for luma to chroma QP values is not present.

When aps_luma_chroma_mapping_present_flag is equal to zero, the value LumaQpToChromaQp[x] is set equal to x for all valid QP values x.

num_qp_ranges_minus1 plus one specifies the number of QP ranges used to describe the QP mapping table between the primary and secondary component. The value of num_qp_ranges_minus1 shall be in the range of zero to 31, inclusive.

The variables InRanges[i], OutRanges[i] and LumaQpToChromaQp[x] are derived as follows:

```
InRanges[ 0 ] = delta_qp_in_range_minus1[ 0 ]
OutRanges[ 0 ] = delta_qp_out_range[ 0 ]
for( i = 1; i <= num_qp_ranges_minus1 + 1; i++ ) {
   InRanges[ i ] = InRanges[ i − 1] + delta_qp_in_range_minus1[ i
] + 1
   OutRanges[ i ] = OutRanges[ i − 1] + delta_qp_out_range[ i ]
}
LumaQpToChromaQp[ InRanges[0] ] = OutRanges[ 0 ]
LumaQpToChromaQp[ InRanges [ num_qp_ranges_minus1 + 1 ] ]=
OutRanges[ num_qp_ranges_minus1 + 1 ]
for( x = InRanges[ 0 ]; x >= InQpMinVal; x−−)// fixed-slope lower
region
LumaQpToChromaQp[ x ] = LumaQpToChromaQp[ x + 1 ] − 1
for( x = InRanges[ num_qp_ranges_minus1 + 1]; x < InQpMaxVal;
x++)
// fixed-slope upper region
   LumaQpToChromaQp[ x + 1] = LumaQpToChromaQp[ x ] + 1
for( i = 0; i < num_qp_ranges_minus1 + 1; i++ ) {
for( x = InRanges[ i ] + 1; x < InRanges[i + 1]; x++ ) {
diffInVal = delta_qp_in_range_minus1[ i + 1] + 1
diffOutVal = delta_qp_out_range[ i + 1 ]
LumaQpToChromaQp[ x ]  = InRanges[ i ] +
(diffOutVal * ( x − InRanges[ i ]) + ( diffInVal >> 1) ) /
   diffInVal
  }
}
```

In one example, the value of LumaQpToChromaQp may be clipped to the valid range of OutQpMinVal to OutQpMaxVal, inclusive.

In one example, the variable InQpMinVal is set equal to the minimum QP value of the primary attribute component (in some cases set equal to four).

In one example, the variable InQpMaxVal is set equal to the maximum QP value of the primary attribute component (in some cases set equal to 51+6*(bitdepth−8), where bitdepth indicates the bit-depth for primary component).

In one example, the variable OutQpMinVal is set equal to the minimum QP value of the secondary attribute component (in some cases set equal to four).

In one example, the variable OutQpMaxVal is set equal to the maximum QP value of the secondary attribute component (in some cases set equal to 51+6*(bitdepth secondary−8), where bitdepth secondary for secondary component(s)).

In some examples, the aps luma chroma mapping_present flag may be signaled in a parameter set (SPS, GPS, APS, etc.) or slice header or other parts of the bitstream.

In one examples, the mapping table may be signaled for each component of the attribute that is not the first component.

Several other improvements may be done to the above mapping function signaling including, but not limited to, the following:

The slope of each range in the mapping table may be constrained to be within a threshold range (e.g., greater than or equal to zero and less than or equal to zero). In one alternative, the maximum value of the threshold range may be dependent on the value of the secondary component bitdepth, or more specifically the difference between the bitdepths of the secondary and primary component.

In one alternative, the slope of the fixed slope lower region (less than InRange[0]) may be determined based on the value of the secondary bitdepth. In the above example, the slope was set to one.

In one alternative, the slope of the fixed slope upper region (greater than InRange[num_qp_ranges_minus1+1]) may be determined based on the value of the secondary bitdepth. In the above example, the slope was set to one.

A syntax element may be signaled to specify whether the same table is used for one or more secondary components of an attribute.

Example 3

In this example, a combination of Example 1 of Mapping Between QP values of the Primary and Secondary Attribute Components and the examples in the section on Signaling of Separate Region Chroma Offsets are described, where the chroma QP is derived using a luma QP and a chroma region QP offset that is signaled. G-PCC decoder 300 may be configured to determine a region QP value for the second component based on the region QP value for the first component and further based on a delta region QP value for the second component.

In the following example, the scaling process for RAHT is modified as follows. Changes relative to a recent G-PCC specification are shown between the brackets <ADD> and </ADD> for additions and between the brackets <DEL> and </DEL> for deletions.

The scaled transform coefficient d[i][cIdx] with i=0 . . . n−1, and cIdx=0 . . . AttrDim−1 is derived as follows:

```
for( i = 0, childIdx = 0; childIdx < 8 && i < n; childIdx++ ) {
  ( dx, dy, dz) = MortonToTuple( childIdx )
  if( Weights[ lvl ][ xTn + dx ][ yTn + dy ][ zTn + dz ] = = 0 )
    continue
  deltaRegionQp<ADD> Luma</ADD> = (PointRegionboxDeltaQp[ lvl ][ xTn + dx ][ yTn + dy ][ zTn + dz ] <ADD> [ 0 ] </ADD> >> RegionQpBitShift)
  <ADD> deltaRegionQpChroma = (PointRegionboxDeltaQp[ lvl ][ xTn + dx ][ yTn + dy ][ zTn + dz ][ 1 ] >> RegionQpBitShift) </ADD>
  qstepY = QpToQstep( SliceQpY[ qlayer ] + deltaRegionQp<ADD> Luma</ADD>, 1 )
  qstepC = QpToQstep(<ADD> SliceQpY[ qlayer ] + deltaRegionQpLuma +</ADD> SliceQp<ADD> Offset</ADD> C[ qlayer ] + <ADD> deltaRegionQpChroma</ADD>, 0 )
  for( cIdx = 0; cIdx < AttrDim; cIdx++ )
    d[ i ][ cIdx ] = DivExp2RoundHalfUp( coeff[ i ][ cIdx ] × ( cIdx == 0 ? qstepY : qstepC), 8 )
  i++
}
```

The inverse quantization process is modified as follows:

```
regionBoxDeltaQp = 0;
if(ash_attr_region_qp_delta_present_flag == 1){
  isPointContainedRegionBox =
    ( RegionboxX <= PointPos[ i ][ 0 ] )
      && ( PointPos[ i ][ 0 ] < ( RegionboxX + RegionboxWidth ) )
      && ( RegionboxY <= PointPos[ i ][ 1 ] )
      && ( PointPos[ i ][ 1 ] < ( RegionboxY + RegionboxHeight ) )
      && ( RegionboxZ <= PointPos[ i ][ 2 ] )
      && ( PointPos[ i ][ 2 ] < ( RegionboxZ + RegionboxDepth ) );
  regionBoxDeltaQp<ADD> Luma </ADD> = isPointContainedRegionBox ? RegionboxDeltaQp<ADD> Luma</ADD> : 0;
  <ADD> regionBoxDeltaQpChroma = isPointContainedRegionBox ? RegionboxDeltaQpChroma : 0; </ADD>
}
```

```
qstepY = QpToQstep( layerQpY + regionBoxDeltaQp<ADD> Luma</ADD>, 1 );
qstepC = QpToQstep( <ADD> layerQpY + regionBoxDeltaQpLuma +</ADD>
layerQp<ADD> Offset</ADD> C + <ADD> regionBoxDeltaQpChroma</ADD>, 0 );
for (a=0; a< AttrDim; a++)
    unquantAttributeCoefficients[ i ][ a ] = residual_values[ a ][ i ] × ( a == 0 ? qstepY :
qstepC);
}
```

Example 4

Example 4 is a variation of Example 3 above, where the clipped luma values are used to calculate the chroma values. In this example, the scaling process for RAHT is modified as follows. Thus, G-PCC decoder 300 may be configured to determine the region QP value for the second component based on a clipped version of the region QP value for the first component (e.g., qpClipY), a layer QP offset value (e.g., SliceQpOffsetC[i]), and a delta region QP value for the second component (e.g., ash attr region qp delta chroma). The scaled transform coefficient d[i][cIdx] with i=0 . . . n−1, and cIdx=0 . . . AttrDim−1 is derived as follows:

```
<ADD> qpBdOffsetLuma = 6*( attribute_bitdepth_minus1[ ash_attr_sps_attr_idx ] −
7 )
qpBdOffsetChroma = 6*( attribute_secondary_bitdepth_minus1[ ash_attr_sps_attr_idx ]
− 7 ) </ADD>
for( i = 0, childIdx = 0; childIdx < 8 && i < n; childIdx++ ) {
    ( dx, dy, dz) = MortonToTuple( childIdx )
    if( Weights[ lvl ][ xTn + dx ][ yTn + dy ][ zTn + dz ] = = 0 )
        continue
    deltaRegionQp<ADD> Luma</ADD> =
(PointRegionboxDeltaQp[ lvl ][ xTn + dx ][ yTn + dy ][ zTn + dz ] <ADD> [ 0 ]
</ADD> >> RegionQpBitShift)
    <ADD> deltaRegionQpChroma =
(PointRegionboxDeltaQp[ lvl ][ xTn + dx ][ yTn + dy ][ zTn + dz ][ 1 ] >>
RegionQpBitShift)
    qpClipY = Clip3(4, 51 + qpBdOffsetLuma, SliceQpY[ qlayer ] +
deltaRegionQpLuma)
    qstepY = QpToQstep( qpClipY)
    qpClipC = Clip3(4, 51 + qpBdOffsetChroma, qpClipY + SliceQpOffsetC[ qlayer ]
+ deltaRegionQpChroma)
    qstepC = QpToQstep( qpClipC ) </ADD>
    for( cIdx = 0; cIdx < AttrDim; cIdx++ )
        d[ i ][ cIdx ] = DivExp2RoundHalfUp( coeff[ i ][ cIdx ] ×
            ( cIdx == 0 ? qstepY : qstepC) , 8 )
    i++
}
```

The inverse quantization process is modified as follows:

```
<ADD> qpBdOffsetLuma = 6*( attribute_bitdepth_minus1[ ash_attr_sps_attr_idx ] −
7 )
qpBdOffsetChroma = 6*( attribute_secondary_bitdepth_minus1[ ash_attr_sps_attr_idx ]
− 7 ) </ADD>
regionBoxDeltaQp = 0;
if(ash_attr_region_qp_delta_present_flag == 1){
    isPointContainedRegionBox =
    ( RegionboxX <= PointPos[ i ][ 0 ] )
        && ( PointPos[ i ][ 0 ] < ( RegionboxX + RegionboxWidth ) )
        && ( RegionboxY <= PointPos[ i ][ 1 ] )
        && ( PointPos[ i ][ 1 ] < ( RegionboxY + RegionboxHeight ) )
        && ( RegionboxZ <= PointPos[ i ][ 2 ] )
        && ( PointPos[ i ][ 2 ] < ( RegionboxZ + RegionboxDepth ) );
    regionBoxDeltaQp<ADD> Luma</ADD> = isPointContainedRegionBox ?
RegionboxDeltaQp<ADD> Luma</ADD> : 0;
    <ADD> regionBoxDeltaQpChroma = isPointContainedRegionBox ?
RegionboxDeltaQpChroma : 0;
}
qpClipY = Clip3( 4, 51 + qpBdOffsetLuma, layerQpY + regionBoxDeltaQpLuma )
qstepY = QpToQstep( qpClipY );
qpClipC = Clip3( 4, 51 + qpBdOffsetLuma, qpClipY + layerQpOffsetC +
regionBoxDeltaQpChroma )
qstepC = QpToQstep( qpClipC ); </ADD>
for (a=0; a< AttrDim; a++)
    unquantAttributeCoefficients[ i ][ a ] = residual_values[ a ][ i ] × ( a == 0 ? qstepY :
qstepC);
}
```

In this example, the QpToQstep( ) function is modified as follows. Inputs of this process are a variable quantization parameter qp and <ADD> variable isFirstComp</ADD>. The output of the process is a variable quantization step qstep computed as follows:

```
<DEL>       If ( isFirstComp )
    qpBdOffset is set equal to
6*( attribute_bitdepth_minus1[ ash_attr_sps_attr_idx ] – 7 )
    otherwise
    qpBdOffset is set equal to
6*( attribute_secondary_bitdepth_minus1[ ash_attr_sps_attr_idx ] – 7
)
    qp = Clip3( 4, 51 + qpBdOffset, qp ); </DEL>
    qstep = levelScale[ qp % 6 ] << ( qp / 6 );
```

Here, the list levelScale[ ] is specified as levelScale [k]=161, 181, 203, 228, 256, 287 with k=0 . . . 5.

Example 5

Example 5 is similar to Example 3, with the difference being that the luma region QP offset is not used to derive the chroma QP. Thus, G-PCC decoder 300 may be configured to determine the region QP value for the second component based on a layer QP value for the first component (e.g., SliceQpY[i]), a layer QP offset value (e.g., SliceQpOffsetC [i]), and/or a delta region QP value for the second component (e.g., ash attr region qp delta chroma). In this example, the scaling process for RAHT is modified as follows:

```
The scaled transform coefficient d[ i ][ cIdx ] with i = 0 .. n – 1, and
cIdx = 0 .. AttrDim – 1 is derived as follows:
for( i = 0, childIdx = 0; childIdx < 8 && i < n; childIdx++ ) {
  ( dx, dy, dz ) = MortonToTuple( childIdx )
  if( Weights[ lvl ][ xTn + dx ][ yTn + dy ][ zTn + dz ] = = 0 )
      continue
  deltaRegionQp<ADD> Luma</ADD> =
(PointRegionboxDeltaQp[ lvl ][ xTn + dx ][ yTn + dy ][ zTn + dz ]
<ADD> [ 0 ]
</ADD>
      >> RegionQpBitShift)
  <ADD> deltaRegionQpChroma =
(PointRegionboxDeltaQp[ lvl ][ xTn + dx ][ yTn + dy ][ zTn + dz ][ 1 ]
      >> RegionQpBitShift) </ADD>
  qstepY = QpToQstep( SliceQpY[ qlayer ] + deltaRegionQp<ADD>
Luma, </ADD>
1 )
  qstepC = QpToQstep(<ADD> SliceQpY[ qlayer ] + </ADD>
SliceQp<ADD>
Offset</ADD> C[ qlayer ] + <ADD> deltaRegionQpChroma</ADD>, 0 )
  for( cIdx = 0; cIdx < AttrDim; cIdx++ )
    d[ i ][ cIdx ] = DivExp2RoundHalfUp( coeff[ i ][ cIdx ] ×
      ( cIdx == 0 ? qstepY : qstepC), 8 )
  i++
}
```

The inverse quantization process is modified as follows:

```
regionBoxDeltaQp = 0;
if(ash_attr_region_qp_delta_present_flag == 1){
  isPointContainedRegionBox =
  ( RegionboxX <= PointPos[ i ][ 0 ] )
    && ( PointPos[ i ][ 0 ] < ( RegionboxX + RegionboxWidth ) )
    && ( RegionboxY <= PointPos[ i ][ 1 ] )
    && ( PointPos[ i ][ 1 ] < ( RegionboxY + RegionboxHeight ) )
    && ( RegionboxZ <= PointPos[ i ][ 2 ] )
    && ( PointPos[ i ][ 2 ] < ( RegionboxZ + RegionboxDepth ) );
regionBoxDeltaQp<ADD> Luma</ADD> = isPointContainedRegionBox
?
RegionboxDeltaQp<ADD> Luma</ADD> : 0;
<ADD> regionBoxDeltaQpChroma = isPointContainedRegionBox ?
RegionboxDeltaQpChroma : 0</ADD>;
}
qstepY = QpToQstep( layerQpY + regionBoxDeltaQp<ADD>
Luma</ADD>, 1 );
qstepC = QpToQstep( <ADD> layerQpY + </ADD> layerQp<ADD>
Offset</ADD> C
+ <ADD> regionBoxDeltaQpChroma, </ADD> 0 );
for (a=0; a< AttrDim; a++)
  unquantAttributeCoefficients[ i ][ a ] = residual_values[ a ][ i ] ×
  ( a == 0 ? qstepY :
qstepC);
}
```

Figure 5:
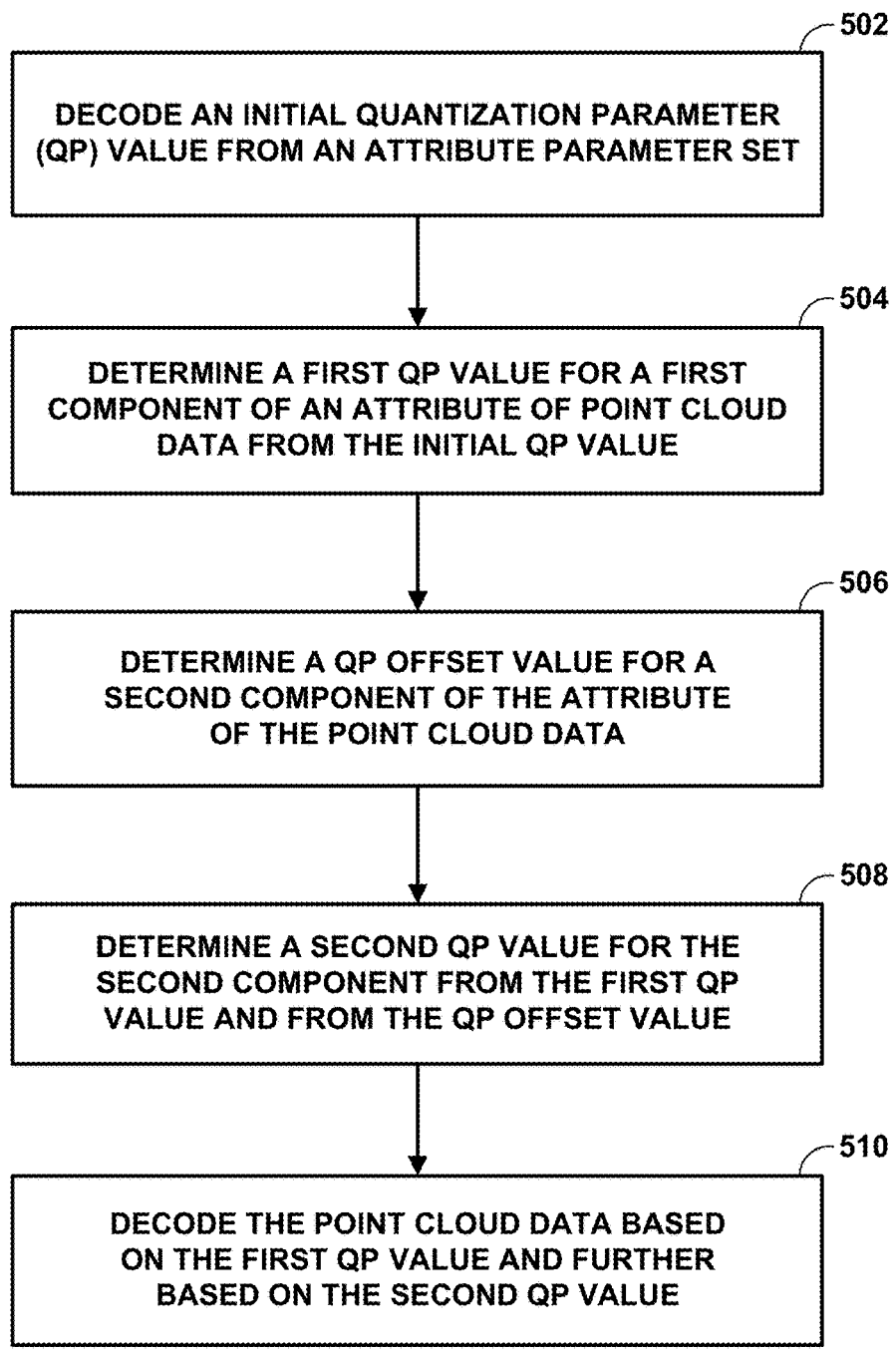
FIG. 5 is a flowchart illustrating an example operation for decoding point cloud data, in accordance with one or more techniques of this disclosure.

FIG. 5 is a flowchart illustrating an example operation for decoding point cloud data, in accordance with one or more techniques of this disclosure. The flowcharts of this disclosure are provided as examples. In other examples, operations may include more, fewer, or different actions or steps. In some examples, actions may be performed in different orders or in parallel. The operations shown in the flowcharts may be performed by one or more processors that are implemented in circuitry.

In the example of FIG. 5, G-PCC decoder 300 decodes an initial QP value from an attribute parameter set (502). One example of an initial QP value syntax element is aps_at-tr_initial_qp. The initial QP value may apply to multiple slices of the point cloud data.

G-PCC decoder 300 also determines a first QP value for a first component of the point cloud data from the initial QP value (504). The first QP value may be a slice layer QP value, a layer QP value, or a region QP value. The first component may include a luma value of the point cloud data. G-PCC decoder 300 may be configured to decode a first delta QP value for the first component. G-PCC decoder 300 may be configured to then determine a first slice QP value from the initial QP value and from the first delta QP value. Additionally or alternatively, G-PCC decoder 300 may be configured to determine a first region QP value or a first layer QP value from the initial QP value and from a delta QP value.

G-PCC decoder 300 determines a QP offset value for a second component of the point cloud data (506). The QP offset value may include a delta slice QP value, a delta layer QP value, a delta region QP value, and/or a sum or combination of two or three of these values. For example, G-PCC decoder 300 can determine a second delta slice QP value for the second component or a second delta region QP value for the second component. The second component may include one or more chroma values of the point cloud data and/or reflectance of the point cloud data.

G-PCC decoder 300 may be configured to generate the QP offset value by applying the first QP value to a mapping table. The mapping table may associate each value of the first QP with a respective QP offset value. Additionally or alternatively, the mapping table may directly associate each value of the first QP with a respective second QP value, so that the QP offset value is not generated as an intermediate step. G-PCC decoder 300 may be configured to decode a syntax element in the point cloud data that specifies the mapping table, where G-PCC decoder 300 may select one of a plurality of predefined mapping tables based on a value of the syntax element. In some examples, G-PCC decoder 300 is configured to determine the QP offset value based on a default mapping table in response to determining that a mapping table is not explicitly signaled in the point cloud data.

G-PCC decoder 300 may be configured to decode a syntax element that indicates if QP offset values for the second component are explicitly signaled in the point cloud data. In response to determining that the syntax element indicates that the QP offset values for the second component are explicitly signaled, G-PCC decoder 300 may be configured to decode a QP offset value that is signaled in the point cloud data. In response to determining that the syntax element indicates that the QP offset values for the second component are not explicitly signaled, G-PCC decoder 300 may be configured to set the QP offset value to a default value.

G-PCC decoder 300 determines a second QP value for the second component from the first QP value and from the QP offset value (508). G-PCC decoder 300 may be configured to determine a second slice QP value from a first slice QP value for the first component and from a second delta slice QP value. G-PCC decoder 300 may be configured to determine a second slice QP value from a first layer or region QP value for the first component and from a second delta slice QP value. Additionally or alternatively, G-PCC decoder 300 may be configured to determine a second region QP value for the second component from a first region QP value for the first component and from a second delta region QP value. G-PCC decoder 300 may be configured to determine a second region QP value for the second component from a second slice or layer QP value for the second component and from a second delta region QP value.

G-PCC decoder 300 may be configured to determine the second QP value from a clipped value of the first QP value. The first QP value may be clipped or constrained within a maximum QP value for the first component and a minimum QP value for the first component. The clipped value of the first QP value may be the version of the first QP value used by G-PCC decoder 300 to decode a slice, layer, or region, so using the clipped value may result in a more accurate determination of the second QP value.

G-PCC decoder 300 decodes the point cloud data based on the first QP value and further based on the second QP value (510). G-PCC decoder 300 may be configured to present at least a portion the point cloud data via a display. For example, G-PCC decoder 300 can present the inverse quantized point cloud data via the display.

Figure 6:
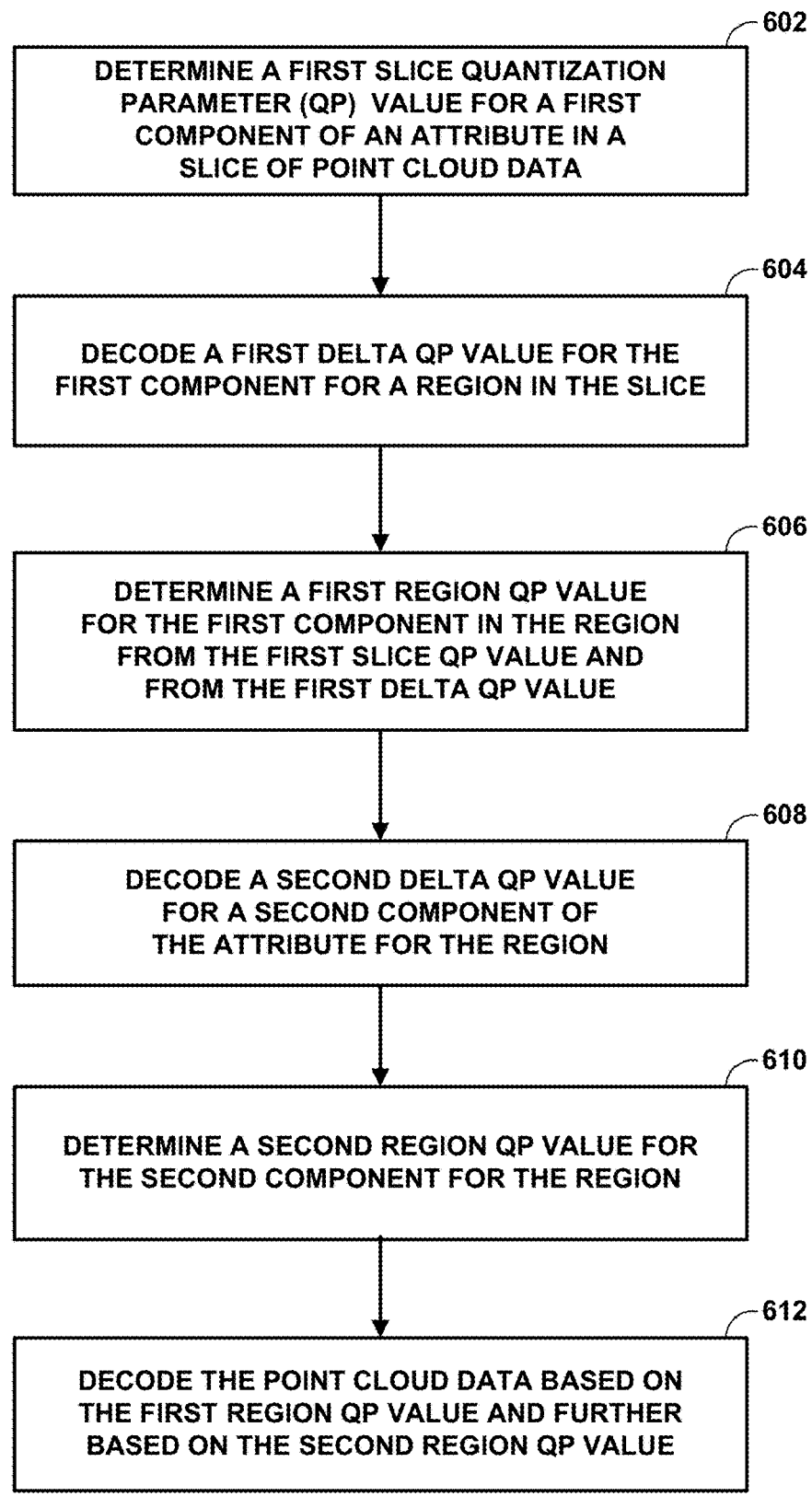
FIG. 6 is a flowchart illustrating an example operation for decoding point cloud data, in accordance with one or more techniques of this disclosure.

FIG. 6 is a flowchart illustrating an example operation for decoding point cloud data, in accordance with one or more techniques of this disclosure. In the example of FIG. 6, G-PCC decoder 300 determines a first slice QP value for a first component in a slice of the point cloud data (602). The first slice QP value may be represented by a variable such as InitialSliceQpY. The first component may include a luma value of the point cloud data.

G-PCC decoder 300 decodes a first delta QP value for the first component for a region in the slice (604). The first delta QP value may be a delta region QP value that is encoded in the point cloud bitstream, such as the syntax element ash_attr_region_qp_delta_luma.

G-PCC decoder 300 determines a first region QP value for the first component in the region from the first slice QP value and from the first delta QP value (606). For example, G-PCC decoder 300 may be configured to determine the first region QP value by summing or subtracting the first slice QP value and the first delta QP value. In some examples, G-PCC decoder 300 may be configured to determine a layer QP value from the slice QP value and then determine the region QP value from the layer QP value. In examples in which a first delta QP value is not explicitly signaled for a region, G-PCC decoder 300 may be configured to set the first region QP value equal to the first slice QP value or equal to a first layer QP value in response to determining that the first delta QP value is not signaled for the region.

G-PCC decoder 300 decodes a second delta QP value for the second component for the region (608). The second delta QP value may be a delta region QP value that is encoded in the point cloud bitstream, such as the syntax element ash_attr_region_qp_delta_chroma. The syntax element for the second delta QP value may be separate from the syntax element for the first delta QP value. The second component may include one or more chroma values of the point cloud data and/or reflectance of the point cloud data.

G-PCC decoder 300 then determines a second region QP value for the second component for the region (610). G-PCC decoder 300 may be configured to determine the second region QP value from the first region QP value and the second delta QP value.

Additionally or alternatively, G-PCC decoder 300 may be configured to determine the second region QP value from a second slice QP value that is represented by a variable such as InitialSliceQpC or from a second layer QP value. G-PCC decoder 300 may be configured to determine the second slice QP value from the first slice QP value and from a slice QP offset value such as InitialSliceQpOffsetC, or from a first layer or region QP value and the slice QP offset value. G-PCC decoder 300 may be configured to determine the second slice QP value from a clipped value of the first slice QP value, the first layer QP value, or the first region QP value. The first slice QP value may be clipped or constrained within a maximum QP value and a minimum QP value for the first component.

G-PCC decoder 300 may be configured to generate the slice QP offset value by applying the first slice QP value to a mapping table. The mapping table may associate each value of the first slice QP with a respective slice QP offset value. Additionally or alternatively, the mapping table may directly associate each value of the first slice QP with a respective second slice QP value, so that the slice QP offset value is not generated as an intermediate step. In some examples, G-PCC decoder 300 is configured to determine the slice QP offset value based on a default mapping table in response to determining that a mapping table is not explicitly signaled in the point cloud data.

In examples in which a second delta QP value is not explicitly signaled for a region, G-PCC decoder 300 may be configured to set the second region QP value equal to the second slice QP value or equal to a second layer QP value in response to determining that the second delta QP value is not signaled for the region.

G-PCC decoder 300 decodes the point cloud data based on the first region QP value and the second region QP value (612). For example, G-PCC decoder 300 may be configured to present at least a portion the point cloud data via a display. G-PCC decoder 300 can present the inverse quantized point cloud data via the display. In some examples, G-PCC decoder 300 may use clipped versions of the QP values to decode the point cloud data.

Figure 7:
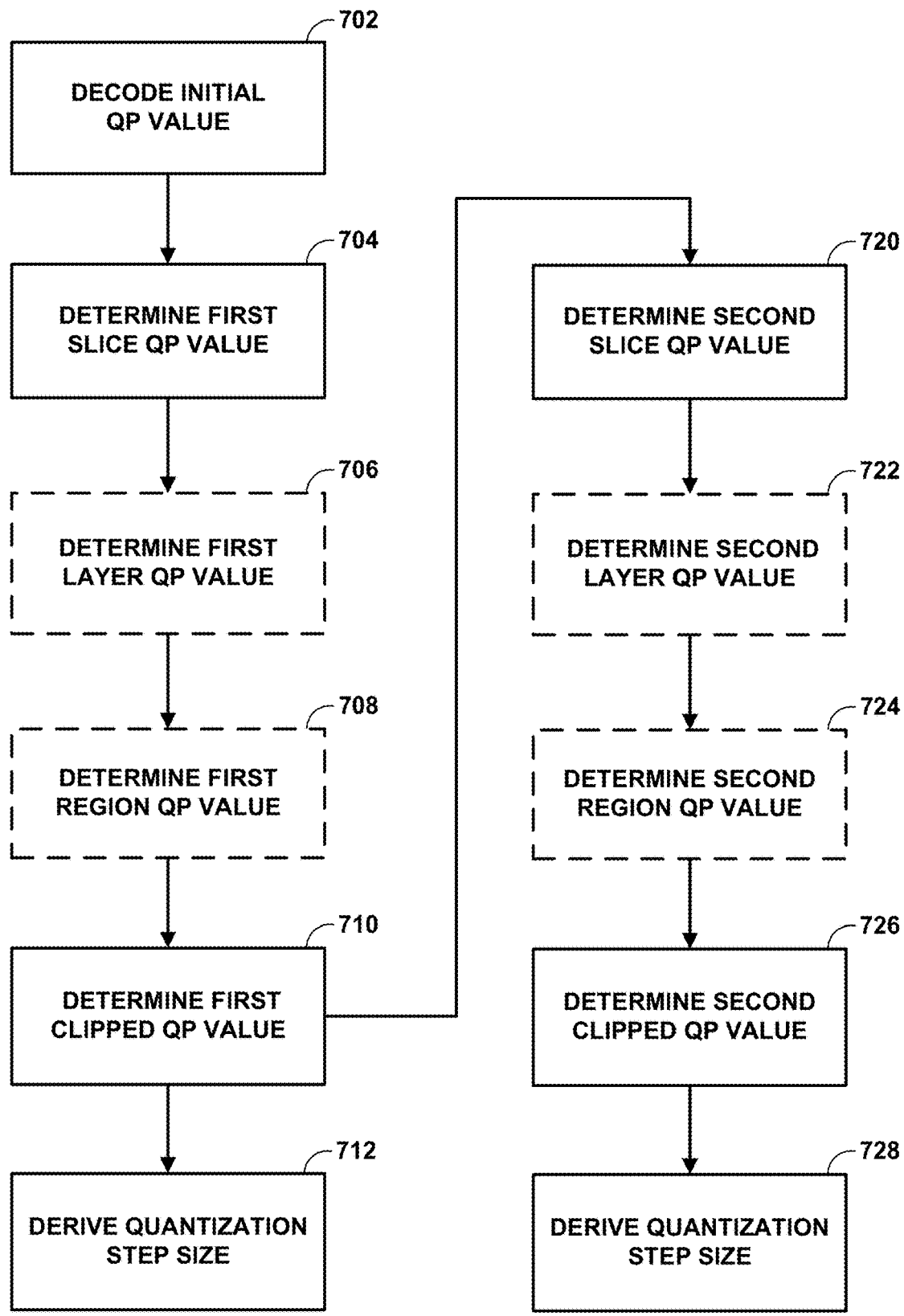
FIG. 7 is a flowchart illustrating an example operation for deriving quantization step sizes using clipped QP values, in accordance with one or more techniques of this disclosure.

FIG. 7 is a flowchart illustrating an example operation for deriving quantization step sizes using clipped QP values, in accordance with one or more techniques of this disclosure. In the example of FIG. 7, G-PCC decoder 300 decodes an initial QP value (702), such as aps_attr_initial_qp. G-PCC decoder 300 then determines a first slice QP value based on the initial QP value (704). For example, G-PCC decoder 300 may be configured to determine Initial SliceQpY based on the initial QP value and a delta slice QP value that is encoded in the point cloud data.

In the example of FIG. 7, G-PCC decoder 300 determines the first layer QP value (706). G-PCC decoder 300 may be configured to determine SliceQpY[i] based on Initial SliceQpY and ash_attr_layer_qp_delta_luma. G-PCC decoder 300 then determines the first region QP value (708). G-PCC decoder 300 can determine the first region QP value based on ash_attr_region_qp_delta_luma. Steps 706 and 708 are optional steps that may not occur when the first layer QP and/or first region QP is the same as the first slice QP value, or when a region is not signaled in the point cloud data.

In the example of FIG. 7, G-PCC decoder 300 determines a first clipped QP value (710). G-PCC decoder 300 may be configured to perform a clipping operation on the first slice QP value, the first layer QP value, or the first region QP value. The clipping operation may involve a maximum allowed value and a minimum allowed value. G-PCC decoder 300 may be configured to determine whether an unclipped QP value is greater than the maximum allowed value and/or whether the unclipped QP value is less than the minimum allowed value. In response to determining that the unclipped QP value is outside of the allowed range, G-PCC decoder 300 can set the clipped QP value to be equal to the maximum allowed value or the minimum allowed value. G-PCC decoder 300 then derives the quantization step size or the scaling step size based on the first clipped QP value (712).

In the example of FIG. 7, G-PCC decoder 300 determines a second slice QP value based on the first clipped QP value (720). For example, G-PCC decoder 300 may be configured to determine Initial SliceQpC based on the clipped QP value and a second delta slice QP value that is encoded in the point cloud data.

In the example of FIG. 7, G-PCC decoder 300 determines the second layer QP value (722). G-PCC decoder 300 may be configured to determine SliceQpC[i] based on the second slice QP value and ash_attr_layer_qp_delta_chroma. G-PCC decoder 300 then determines the second region QP value (724). G-PCC decoder 300 can determine the second region QP value based on ash_attr_region_qp_delta_chroma. Steps 722 and 724 are optional steps that may not occur when the second layer QP and/or second region QP is the same as the second slice QP value, or when a region is not signaled in the point cloud data.

In the example of FIG. 7, G-PCC decoder 300 determines a second clipped QP value (726). G-PCC decoder 300 may be configured to perform a clipping operation on the second slice QP value, the second layer QP value, or the second region QP value. G-PCC decoder 300 can use the same or different maximum and minimum allowed values for determining the second clipped QP value as for determining the first clipped QP value. G-PCC decoder 300 then derives the quantization step size or the scaling step size based on the second clipped QP value (728).

An example implementation may include a maximum allowed value of 51 for the first and second region QP values. In examples in which G-PCC decoder 300 determines the unclipped first region QP value to be 55, G-PCC decoder 300 may then set the clipped first region QP value to be equal to 51. If G-PCC decoder 300 uses the unclipped version of the first region QP value to determine the first slice QP value, G-PCC decoder 300 may determine the unclipped second region QP value to be 52 and the clipped second region QP value to be 51. If G-PCC decoder 300 uses the clipped version of the first region QP value to determine the first slice QP value, G-PCC decoder 300 may determine the clipped and unclipped second region QP value to be equal to 48. Thus, using the unclipped version of the first QP value to determine the second QP value(s) may result in equal values for the first and second QP values, even for a nonzero QP offset value. Using the version of the first QP value to determine the second QP value(s) may result in a difference between the first and second QP values for a nonzero QP offset value, which may improve the accuracy of the decoded point cloud data.

Figure 8:
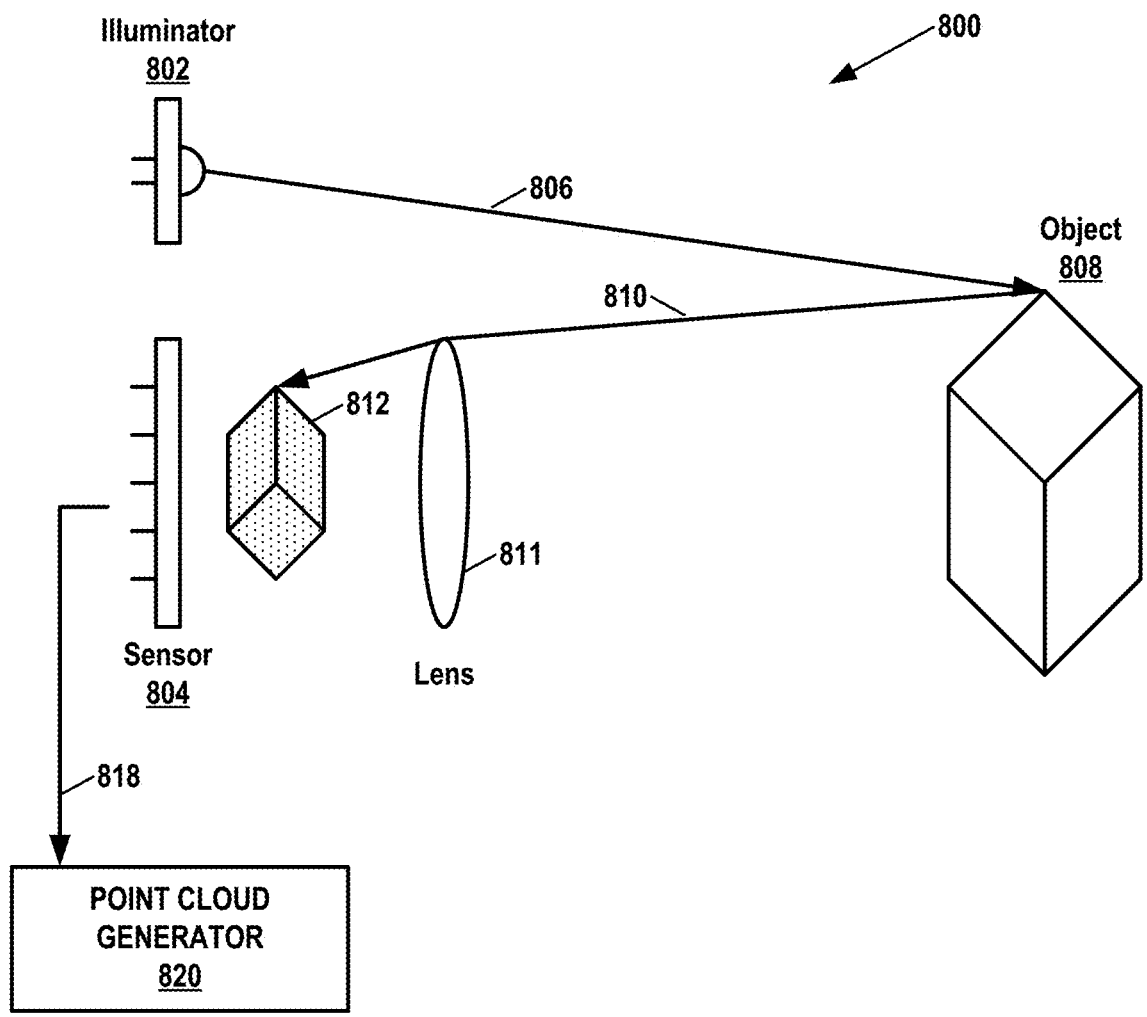
FIG. 8 is a conceptual diagram illustrating an example range-finding system that may be used with one or more techniques of this disclosure.

FIG. 8 is a conceptual diagram illustrating an example range-finding system 800 that may be used with one or more techniques of this disclosure. In the example of FIG. 8, range-finding system 800 includes an illuminator 802 and a sensor 804. Illuminator 802 may emit light 806. In some examples, illuminator 802 may emit light 806 as one or more laser beams. Light 806 may be in one or more wavelengths, such as an infrared wavelength or a visible light wavelength. In other examples, light 806 is not coherent, laser light. When light 806 encounters an object, such as object 808, light 806 creates returning light 810. Returning light 810 may include backscattered and/or reflected light. Returning light 810 may pass through a lens 811 that directs returning light 810 to create an image 812 of object 808 on sensor 804. Sensor 804 generates signals 814 based on image 812. Image 812 may comprise a set of points (e.g., as represented by dots in image 812 of FIG. 8).

In some examples, illuminator 802 and sensor 804 may be mounted on a spinning structure so that illuminator 802 and sensor 804 capture a 360-degree view of an environment. In other examples, range-finding system 800 may include one or more optical components (e.g., mirrors, collimators, diffraction gratings, etc.) that enable illuminator 802 and sensor 804 to detect objects within a specific range (e.g., up to 360-degrees). Although the example of FIG. 8 only shows a single illuminator 802 and sensor 804, range-finding system 800 may include multiple sets of illuminators and sensors.

In some examples, illuminator 802 generates a structured light pattern. In such examples, range-finding system 800 may include multiple sensors 804 upon which respective images of the structured light pattern are formed. Range-finding system 800 may use disparities between the images of the structured light pattern to determine a distance to an object 808 from which the structured light pattern backscatters. Structured light-based range-finding systems may have a high level of accuracy (e.g., accuracy in the sub-millimeter range), when object 808 is relatively close to sensor 804 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 800 is a time of flight (ToF)-based system. In some examples where range-finding system 800 is a ToF-based system, illuminator 802 generates pulses of light. In other words, illuminator 802 may modulate the amplitude of emitted light 806. In such examples, sensor 804 detects returning light 810 from the pulses of light 806 generated by illuminator 802. Range-finding system 800 may then determine a distance to object 808 from which light 806 backscatters based on a delay between when light 806 was emitted and detected and the known speed of light in air). In some examples, rather than (or in addition to) modulating the amplitude of the emitted light 806, illuminator 802 may modulate the phase of the emitted light 1404. In such examples, sensor 804 may detect the phase of returning light 810 from object 808 and determine distances to points on object 808 using the speed of light and based on time differences between when illuminator 802 generated light 806 at a specific phase and when sensor 804 detected returning light 810 at the specific phase.

In other examples, a point cloud may be generated without using illuminator 802. For instance, in some examples, sensor 804 of range-finding system 800 may include two or more optical cameras. In such examples, range-finding system 800 may use the optical cameras to capture stereo images of the environment, including object 808. Range-finding system 800 (e.g., point cloud generator 820) may then calculate the disparities between locations in the stereo images. Range-finding system 800 may then use the disparities to determine distances to the locations shown in the stereo images. From these distances, point cloud generator 820 may generate a point cloud.

Sensors 804 may also detect other attributes of object 808, such as color and reflectance information. In the example of FIG. 8, a point cloud generator 820 may generate a point cloud based on signals 818 generated by sensor 804. Range-finding system 800 and/or point cloud generator 820 may form part of data source 104 (FIG. 1).

Figure 9:
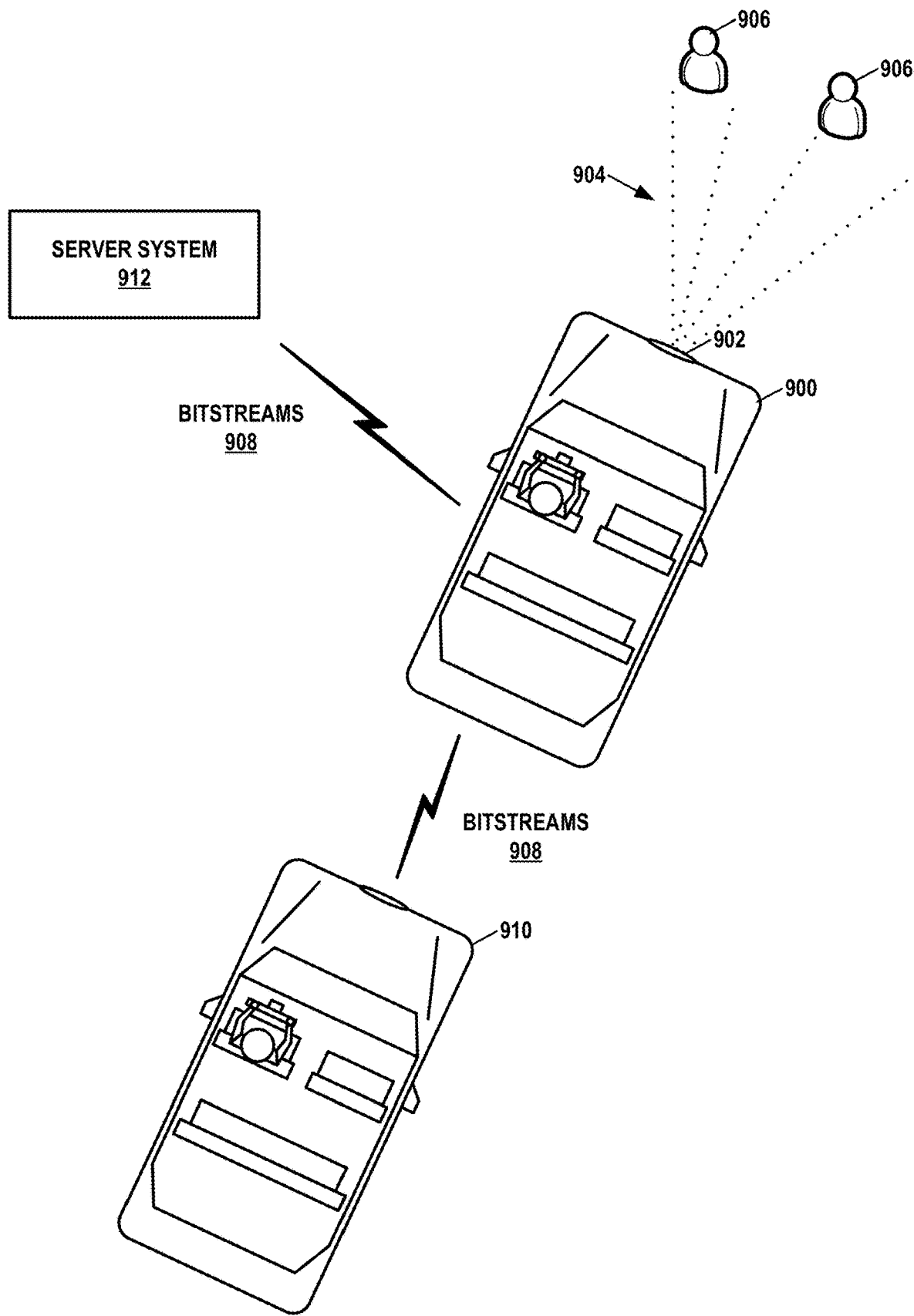
FIG. 9 is a conceptual diagram illustrating an example vehicle-based scenario in which one or more techniques of this disclosure may be used.

FIG. 9 is a conceptual diagram illustrating an example vehicle-based scenario in which one or more techniques of this disclosure may be used. In the example of FIG. 9, a vehicle 900 includes a laser package 902, such as a LIDAR system. Laser package 902 may be implemented in the same manner as laser package 500 (FIG. 5). Although not shown in the example of FIG. 9, vehicle 900 may also include a data source, such as data source 104 (FIG. 1), and a G-PCC encoder, such as G-PCC encoder 200 (FIG. 1). In the example of FIG. 9, laser package 902 emits laser beams 904 that reflect off pedestrians 906 or other objects in a roadway. The data source of vehicle 900 may generate a point cloud based on signals generated by laser package 902. The G-PCC encoder of vehicle 900 may encode the point cloud to generate bitstreams 908 (e.g., point cloud data), such as geometry bitstream 203 (FIG. 2) and attribute bitstream 205 (FIG. 2). Bitstreams 908 may include many fewer bits than the unencoded point cloud obtained by the G-PCC encoder. An output interface of vehicle 900 (e.g., output interface 108 (FIG. 1) may transmit bitstreams 908 to one or more other devices. Thus, vehicle 900 may be able to transmit bitstreams 908 to other devices more quickly than the unencoded point cloud data. Additionally, bitstreams 908 may require less data storage capacity.

The techniques of this disclosure may further reduce the number of bits in bitstreams 908. For instance, determining a predicted value based on a first laser angle and a second laser angle, and determining a third laser angle based on the predicted value and a laser angle difference may reduce the number of bits in bitstreams 908 associated with the third laser angle. Similarly, bitstream 908 may include fewer bits when a G-PCC coder determines a value for a first laser, the value for the first laser indicating a number of probes in an azimuth direction of the first laser, decodes a syntax element for a second laser, wherein the syntax element for the second laser indicates a difference between the value for the first laser and a value for the second laser, the value for the second laser indicating a number of probes in the azimuth direction of the second laser; and determines one or more points of the point cloud data based on the number of probes in the azimuth direction of the second laser.

In the example of FIG. 9, vehicle 900 may transmit bitstreams 908 to another vehicle 910. Vehicle 910 may include a G-PCC decoder, such as G-PCC decoder 300 (FIG. 1). The G-PCC decoder of vehicle 910 may decode bitstreams 908 to reconstruct the point cloud. Vehicle 910 may use the reconstructed point cloud for various purposes. For instance, vehicle 910 may determine based on the reconstructed point cloud that pedestrians 906 are in the roadway ahead of vehicle 900 and therefore start slowing down, e.g., even before a driver of vehicle 910 realizes that pedestrians 906 are in the roadway. Thus, in some examples, vehicle 910 may perform an autonomous navigation operation, generate a notification or warning, or perform another action based on the reconstructed point cloud.

Additionally or alternatively, vehicle 900 may transmit bitstreams 908 to a Server system 912. Server system 912 may use bitstreams 908 for various purposes. For example, server system 912 may store bitstreams 908 for subsequent reconstruction of the point clouds. In this example, server system 912 may use the point clouds along with other data (e.g., vehicle telemetry data generated by vehicle 900) to train an autonomous driving system. In other example, server system 912 may store bitstreams 908 for subsequent reconstruction for forensic crash investigations (e.g., if vehicle 900 collides with pedestrians 906).

Figure 10:
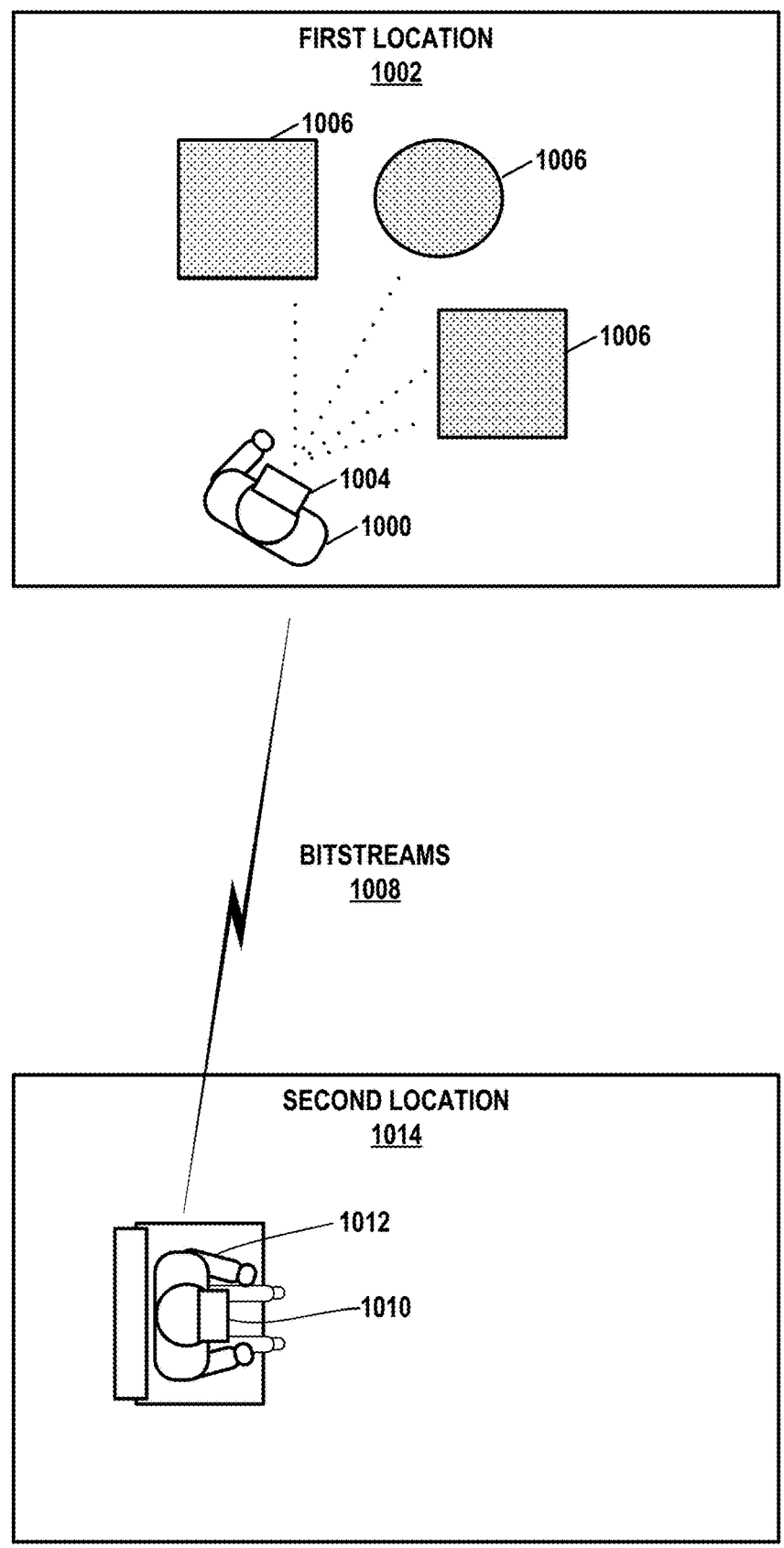
FIG. 10 is a conceptual diagram illustrating an example extended reality system in which one or more techniques of this disclosure may be used.

FIG. 10 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 10, a first user 1000 is located in a first location 1002. User 1000 wears an XR headset 1004. As an alternative to XR headset 1004, user 1000 may use a mobile device (e.g., mobile phone, tablet computer, etc.). XR headset 1004 includes a depth detection sensor, such as a LIDAR system, that detects positions of points on objects 1006 at location 1002. A data source of XR headset 1004 may use the signals generated by the depth detection sensor to generate a point cloud representation of objects 1006 at location 1002. XR headset 1004 may include a G-PCC encoder (e.g., G-PCC encoder 200 of FIG. 1) that is configured to encode the point cloud to generate bitstreams 1008.

The techniques of this disclosure may further reduce the number of bits in bitstreams 1008. For instance, determining a predicted value based on a first laser angle and a second laser angle, and determining a third laser angle based on the predicted value and a laser angle difference may reduce the number of bits in bitstreams 1008 associated with the third laser angle. Similarly, bitstream 1008 may include fewer bits when a G-PCC coder determines a value for a first laser, the value for the first laser indicating a number of probes in an azimuth direction of the first laser, decodes a syntax element for a second laser, wherein the syntax element for the second laser indicates a difference between the value for the first laser and a value for the second laser, the value for the second laser indicating a number of probes in the azimuth direction of the second laser; and determines one or more points of the point cloud data based on the number of probes in the azimuth direction of the second laser.

XR headset 1004 may transmit bitstreams 1008 (e.g., via a network such as the Internet) to an XR headset 1010 worn by a user 1012 at a second location 1014. XR headset 1010 may decode bitstreams 1008 to reconstruct the point cloud. XR headset 1010 may use the point cloud to generate an XR visualization (e.g., an AR, MR, VR visualization) representing objects 1006 at location 1002. Thus, in some examples, such as when XR headset 1010 generates a VR visualization, user 1012 at location 1014 may have a 3D immersive experience of location 1002. In some examples, XR headset 1010 may determine a position of a virtual object based on the reconstructed point cloud. For instance, XR headset 1010 may determine, based on the reconstructed point cloud, that an environment (e.g., location 1002) includes a flat surface and then determine that a virtual object (e.g., a cartoon character) is to be positioned on the flat surface. XR headset 1010 may generate an XR visualization in which the virtual object is at the determined position. For instance, XR headset 1010 may show the cartoon character sitting on the flat surface.

Figure 11:
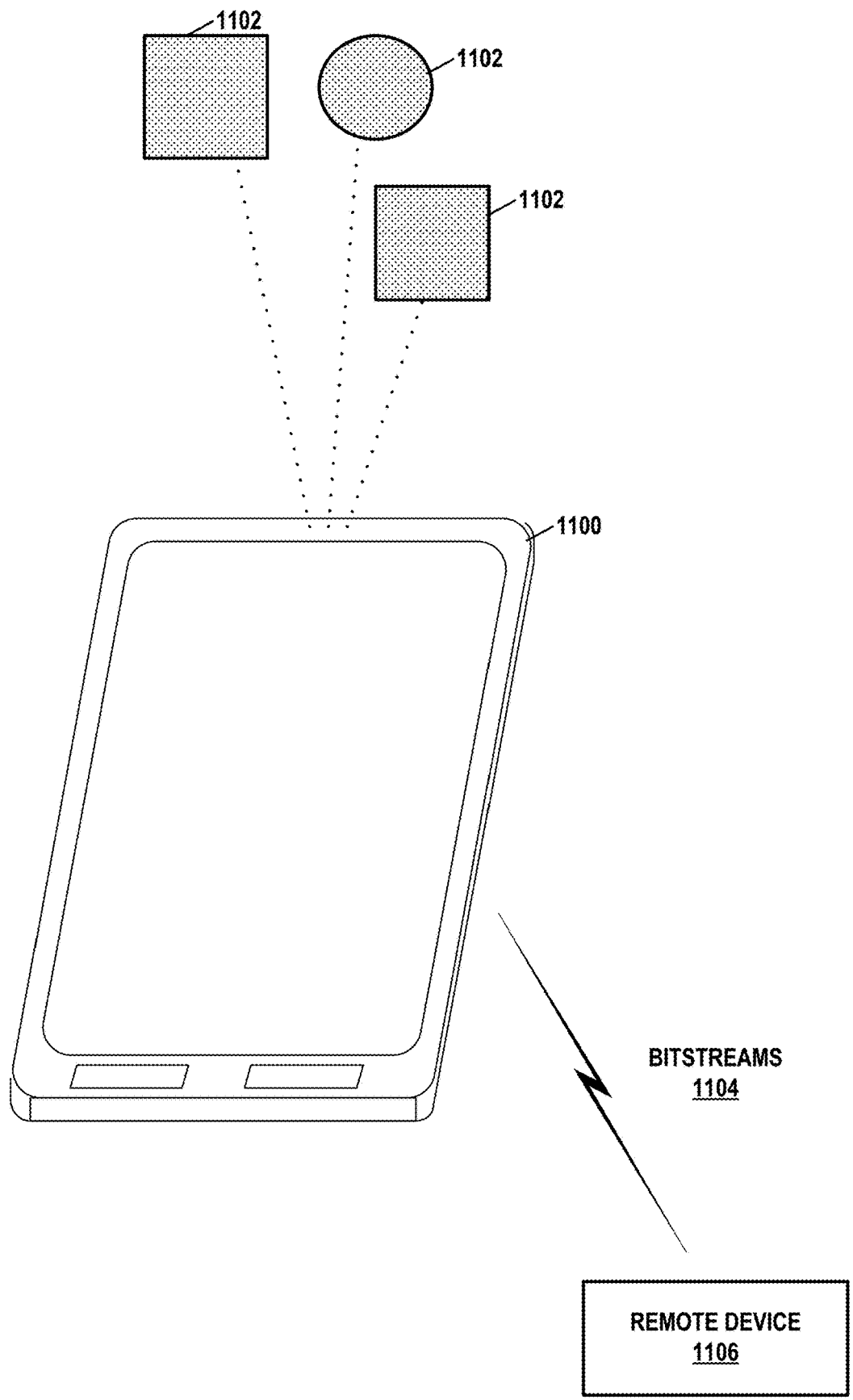
FIG. 11 is a conceptual diagram illustrating an example mobile device system in which one or more techniques of this disclosure may be used.

FIG. 11 is a conceptual diagram illustrating an example mobile device system in which one or more techniques of this disclosure may be used. In the example of FIG. 11, a mobile device 1100, such as a mobile phone or tablet computer, includes a depth detection sensor, such as a LIDAR system, that detects positions of points on objects 1102 in an environment of mobile device 1100. A data source of mobile device 1100 may use the signals generated by the depth detection sensor to generate a point cloud representation of objects 1102. Mobile device 1100 may include a G-PCC encoder (e.g., G-PCC encoder 200 of FIG. 1) that is configured to encode the point cloud to generate bitstreams 1104. In the example of FIG. 11, mobile device 1100 may transmit bitstreams to a remote device 1106, such as a server system or other mobile device. Remote device 1106 may decode bitstreams 1104 to reconstruct the point cloud. Remote device 1106 may use the point cloud for various purposes. For example, remote device 1106 may use the point cloud to generate a map of environment of mobile device 1100. For instance, remote device 1106 may generate a map of an interior of a building based on the reconstructed point cloud. In another example, remote device 1106 may generate imagery (e.g., computer graphics) based on the point cloud. For instance, remote device 1106 may use points of the point cloud as vertices of polygons and use color attributes of the points as the basis for shading the polygons. In some examples, remote device 1106 may perform facial recognition using the point cloud.

The techniques of this disclosure may further reduce the number of bits in bitstreams 1104. For instance, determining a predicted value based on a first laser angle and a second laser angle, and determining a third laser angle based on the predicted value and a laser angle difference may reduce the number of bits in bitstreams 1104 associated with the third laser angle. Similarly, bitstream 1104 may include fewer bits when a G-PCC coder determines a value for a first laser, the value for the first laser indicating a number of probes in an azimuth direction of the first laser, decodes a syntax element for a second laser, wherein the syntax element for the second laser indicates a difference between the value for the first laser and a value for the second laser, the value for the second laser indicating a number of probes in the azimuth direction of the second laser; and determines one or more points of the point cloud data based on the number of probes in the azimuth direction of the second laser.

Examples in the various aspects of this disclosure may be used individually or in any combination. The following is a non-limiting list of aspects that are in accordance with one or more techniques of this disclosure.

Aspect 1. A method of coding point cloud data includes coding one or more QP offset terms for one or more secondary components of a region of a point cloud. The method also includes coding the secondary components of the region of the point cloud using the one or more QP offset terms.

Aspect 2. The method of aspect 1, wherein the one or more secondary components of the region of the point cloud include one or more chroma components.

Aspect 3. A method of coding point cloud data includes coding a flag that indicates whether a bitdepth of a secondary component of point cloud data is more than a bitdepth of a primary component of the point cloud data. The method also includes coding the point cloud data in accordance with the flag.

Aspect 4. The method of aspect 3, wherein the secondary component is one or more chroma components of the point cloud data, and wherein the primary component is a luma component of the point cloud data.

Aspect 5. The method of aspect 3 or aspect 4, further including constraining the bitdepth of the secondary component to be equal to the bitdepth of the primary component or equal to the bitdepth of the primary component plus one.

Aspect 6. The method of aspects 3-5 or any combination thereof, constraining the bitdepth of the secondary component to be equal to the bitdepth of the primary component or equal to the bitdepth of the primary component plus one.

Aspect 7. The method of aspects 3-6 or any combination thereof, further including constraining the bitdepth of the secondary component to be less than or equal to the bitdepth of the primary component plus one.

Aspect 8. The method of aspects 3-7 or any combination thereof, further including constraining the bitdepth of the secondary component to be different from the bitdepth of the primary component only when the color space of the point cloud data is YCoCg-R.

Aspect 9. The method of aspects 3-8 or any combination thereof, further including constraining the bitdepth of the secondary component to always be different from the bitdepth of the primary component when the color space of the point cloud data is YCoCg-R.

Aspect 10. The method of aspects 3-9 or any combination thereof, wherein the flag indicates that the bitdepth of the secondary component is different than the bitdepth of the primary component.

Aspect 11. The method of aspects 3-10 or any combination thereof, further including determining the bitdepth of the secondary component based on a pre-determined number of steps away from the bitdepth of the primary component.

Aspect 12. The method of aspects 3-11 or any combination thereof, further including coding a syntax element specifying a delta-coded value of the bitdepth of the secondary component relative to the primary component.

Aspect 13. A method of decoding point cloud data includes determining a luma QP value, determining a chroma QP offset value, determining a chroma QP value from the luma QP value and the chroma QP offset value.

Aspect 14. The method of aspect 13, wherein determining that luma QP value includes determining the luma QP value from an initial luma QP value and a luma QP offset value.

Aspect 15. The method of aspect 13 or aspect 14, wherein determining the chroma QP offset value comprises determining a chroma QP offset value from a mapping table.

Aspect 16. The method of aspect 13-15 or any combination thereof, further including decoding a syntax element that specifies the mapping table.

Aspect 17. The method of aspect 13-16 or any combination thereof, decoding a syntax element that indicates if chroma QP offset values are explicitly signaled.

Aspect 18. The method of the preceding aspects or any combination thereof, further including generating the point cloud.

Aspect 19. The method of the preceding aspects or any combination thereof, further including presenting the decoded point cloud data via a display.

Aspect 20. The method of the preceding aspects or any combination thereof, wherein coding includes decoding.

Aspect 21. The method of the preceding aspects or any combination thereof, wherein coding includes encoding.

Aspect 22. A computer-readable storage medium having stored thereon instructions that, when executed, cause one or more processors to perform the method of the preceding aspects or any combination thereof.

Aspect 23. A device for processing a point cloud, where the device includes one or more means for performing the method of the preceding aspects or any combination thereof.

Aspect 24. The device of aspect 23, wherein the one or more means comprise one or more processors implemented in circuitry.

Aspect 25. The device of aspect 23 or aspect 24, further including a memory to store the data representing the point cloud.

Aspect 26. The device of aspects 23-25 or any combination thereof, wherein the device includes a decoder.

Aspect 27. The device of aspects 23-26 or any combination thereof, wherein the device includes an encoder.

Aspect 28. The device of aspects 23-27 or any combination thereof, further including a device to generate the point cloud.

Aspect 29. The device of aspects 23-28 or any combination thereof, further including a display to present imagery based on the point cloud.

Aspect 30. A method of decoding a point cloud includes decoding an initial QP value from an attribute parameter set; determining a first QP value for a first component of an attribute of the point cloud data from the initial QP value; determining a QP offset value for a second component of the attribute of the point cloud data; determining a second QP value for the second component of the attribute from the first QP value and from the QP offset value; and decoding the point cloud data based on the first QP value and further based on the second QP value.

Aspect 31. A method of decoding a point cloud includes determining a first slice QP value for a first component of an attribute in a slice of the point cloud data; decoding a first delta QP value for the first component of the attribute for a region in the slice; determining a first region QP value for the first component of the attribute in the region from the first slice QP value and from the first delta QP value; decoding a second delta QP value for the second component of the attribute for the region; determining a second region QP value for the second component of the attribute in the region from the second delta QP value; and decoding the point cloud data based on the first region QP value and further based on the second region QP value.

Aspect 32. The method of the preceding aspects or any combination thereof, wherein the first component of the attribute is a luma component of the point cloud data.

Aspect 33. The method of the preceding aspects or any combination thereof, wherein the first component of the attribute is a first chroma component of the point cloud data.

Aspect 34. The method of the preceding aspects or any combination thereof, wherein the second component of the attribute is one or more chroma components of the point cloud data.

Aspect 35. The method of the preceding aspects or any combination thereof, further comprising decoding a first delta QP value for the first component, wherein determining the first QP value comprises determining a first slice QP value for a slice of the point cloud data from the initial QP value and from the first delta QP value.

Aspect 36. The method of the preceding aspects or any combination thereof, further including determining a first region QP value for the first component for a region in the slice from a first slice QP value.

Aspect 37. The method of the preceding aspects or any combination thereof, wherein determining the QP offset value comprises decoding a second delta QP value for the second component.

Aspect 38. The method of the preceding aspects or any combination thereof, wherein determining the second QP value comprises determining a second slice QP value for the slice from a first region QP value and from the QP offset value.

Aspect 39. The method of the preceding aspects or any combination thereof, further including decoding a third delta QP value for the first component; and determining a second region QP value for the second component for the region from the second slice QP value and from the third delta QP value.

Aspect 40. The method of the preceding aspects or any combination thereof, further including decoding the point cloud data based on a first region QP value and further based on a second region QP value.

Aspect 41. The method of the preceding aspects or any combination thereof, further comprising determining a first unclipped QP value for the first component from the initial QP value.

Aspect 42. The method of the preceding aspects or any combination thereof, wherein determining the first QP value comprises determining a first clipped QP value from a first unclipped QP value.

Aspect 43. The method of the preceding aspects or any combination thereof, further including determining a second unclipped QP value for the second component from a first clipped QP value and from the QP offset value.

Aspect 44. The method of the preceding aspects or any combination thereof, wherein determining the second QP value comprises determining a second clipped QP value from a second unclipped QP value.

Aspect 45. The method of the preceding aspects or any combination thereof, wherein decoding the point cloud data is based on a first clipped QP value and further based on a second clipped QP value.

Aspect 46. The method of the preceding aspects or any combination thereof, wherein a first clipped QP value is constrained within an allowed range, wherein the allowed range is bounded by a maximum QP value for the first component and a minimum QP value for the first component.

Aspect 47. The method of the preceding aspects or any combination thereof, wherein determining the QP offset value comprises applying the first QP value to a mapping table.

Aspect 48. The method of the preceding aspects or any combination thereof, further comprising decoding a syntax element that specifies a mapping table.

Aspect 49. The method of the preceding aspects or any combination thereof, further comprising determining a mapping table from a plurality of mapping tables based on a value of a syntax element.

Aspect 50. The method of the preceding aspects or any combination thereof, further comprising determining that the mapping table is not explicitly signaled in the point cloud data.

Aspect 51. The method of the preceding aspects or any combination thereof, wherein determining the QP offset value comprises determining the QP offset value based on a default mapping table in response to determining that a mapping table is not explicitly signaled in the point cloud data.

Aspect 52. The method of the preceding aspects or any combination thereof, further comprising decoding a syntax element that indicates if offset values for the second component are explicitly signaled in the point cloud data and decoding the QP offset value for the second component in response to determining that the syntax element indicates that the QP offset values for the second component are explicitly signaled.

Aspect 53. The method of the preceding aspects or any combination thereof, further including determining that a syntax element indicates that offset values for the second component are not explicitly signaled in the point cloud data.

Aspect 54. The method of the preceding aspects or any combination thereof, further including setting the QP offset value to a default value in response to determining that the syntax element indicates that the offset values for the second component are not explicitly signaled.

Aspect 55. The method of the preceding aspects or any combination thereof, further comprising determining a bitdepth of the second component based on a bitdepth of the first component and further based on a flag, wherein the flag comprises a single bit in a sequence parameter set.

Aspect 56. The method of the preceding aspects or any combination thereof, wherein a flag comprising a single bit in a sequence parameter set indicates whether a bitdepth of the second component is equal to a bitdepth of the first component.

Aspect 57. The method of the preceding aspects or any combination thereof, further comprising setting a bitdepth of the second component equal to a maximum bitdepth regardless of a value of a flag comprising a single bit in a sequence parameter set in response to determining that a bitdepth of the first component is greater than or equal to the maximum bitdepth.

Aspect 58. The method of the preceding aspects or any combination thereof, wherein a bitdepth of the second component is constrained to be equal to a bitdepth of the first component or equal to the bitdepth of the first component plus one.

Aspect 59. The method of the preceding aspects or any combination thereof, further comprising presenting at least a portion of the point cloud data via a display.

Aspect 60. The method of the preceding aspects or any combination thereof, further including determining that a third delta QP value for the second component is not signaled for a second region in a second slice.

Aspect 61. The method of the preceding aspects or any combination thereof, further including setting a third region QP value for the second component for the second region to be equal to a third slice QP value for the second component for the second slice in response to determining that a third delta QP value for the second component is not signaled for the second region.

Aspect 62. The method of the preceding aspects or any combination thereof, further including determining that a fourth delta QP value for the first component is not signaled for the second region.

Aspect 63. The method of the preceding aspects or any combination thereof, further including setting a fourth region QP value for the first component in the second region to be equal to a fourth slice QP value for the first component for the second slice in response to determining that a fourth delta QP value for the first component is not signaled for the second region.

Aspect 64. The method of the preceding aspects or any combination thereof, further comprising determining a second slice QP value for a second component for the slice.

Aspect 65. The method of the preceding aspects or any combination thereof, wherein determining the second region QP value comprises determining the second region QP value from the second delta QP value and also from a second slice QP value.

Aspect 66. The method of the preceding aspects or any combination thereof, wherein determining a second slice QP value comprises determining the second slice QP value from the first region QP value.

Aspect 67. The method of the preceding aspects or any combination thereof, further including decoding a first syntax element representing the first delta QP value.

Aspect 68. The method of the preceding aspects or any combination thereof, further including decoding a second syntax element representing the second delta QP value for the second component for the region by at least decoding the second syntax element separately from decoding the first syntax element representing the first delta QP value.

Aspect 69. The method of the preceding aspects or any combination thereof, further including determining a slice QP offset value for the second component for the slice and determining a second slice QP value from the first region slice QP value and the slice QP offset value.

Aspect 70. The method of the preceding aspects or any combination thereof, wherein the first region QP value comprises a clipped QP value constrained within an allowed range for the first region QP value.

Aspect 71. The method of the preceding aspects or any combination thereof, wherein determining a second slice QP value comprises determining the second slice QP value from a clipped QP value and from a slice QP offset value.

Aspect 72. The method of the preceding aspects or any combination thereof, wherein determining a slice QP offset value comprises applying the first region QP value to a mapping table.

Aspect 73. The method of the preceding aspects or any combination thereof, further including determining that a syntax element indicates that offset values for the second component are not explicitly signaled in the point cloud data.

Aspect 74. The method of the preceding aspects or any combination thereof, further including setting a slice QP offset value to a default value in response to determining that a syntax element indicates that the offset values for the second component are not explicitly signaled.

Aspect 75. A device for decoding a point cloud includes memory configured to store point cloud data; and one or more processors implemented in circuitry and communicatively coupled to the memory, the one or more processors being configured to: decode an initial QP value from an attribute parameter set; determine a first QP value for a first component of an attribute of the point cloud data from the initial QP value; determine a QP offset value for a second component of the attribute of the point cloud data; determine a second QP value for the second component of the attribute from the first QP value and from the QP offset value; and decode the point cloud data based on the first QP value and further based on the second QP value.

Aspect 76. The device of the preceding aspect, further comprising a display, wherein the one or more processors are configured to present the point cloud data via the display.

Aspect 77. The device of the preceding aspects or any combination thereof, wherein the one or more processors are configured to decode a first delta QP value for the first component and determine the first QP value by at least determining a first slice QP value for a slice of the point cloud data from the initial QP value and from the first delta QP value.

Aspect 78. The device of the preceding aspects or any combination thereof, wherein the one or more processors are configured to determine a first region QP value for the first component for a region in the slice from a first slice QP value.

Aspect 79. The device of the preceding aspects or any combination thereof, wherein the one or more processors are configured to determine the second QP value by at least determining a second slice QP value for the slice from a first region QP value and from the QP offset value.

Aspect 80. The device of the preceding aspects or any combination thereof, wherein the one or more processors are configured to determine a first unclipped QP value for the first component from the initial QP value.

Aspect 81. The device of the preceding aspects or any combination thereof, wherein to determine the first QP value, the one or more processors are configured to determine a first clipped QP value from a first unclipped QP value.

Aspect 82. The device of the preceding aspects or any combination thereof, wherein the one or more processors are configured to determine a second unclipped QP value for the second component from a first clipped QP value and from the QP offset value.

Aspect 83. The device of the preceding aspects or any combination thereof, wherein to determine the second QP value, the one or more processors are configured to determine a second clipped QP value from a second unclipped QP value.

Aspect 84. The device of the preceding aspects or any combination thereof, wherein to decode the point cloud data, the one or more processors are configured to decode the point cloud data based on the first clipped QP value and further based on the second clipped QP value.

Aspect 85. The device of the preceding aspects or any combination thereof, wherein the one or more processors are configured to determine the QP offset value by at least applying the first QP value to a mapping table.

Aspect 86. A device for decoding a point cloud includes memory configured to store point cloud data; and one or more processors implemented in circuitry and communicatively coupled to the memory, the one or more processors being configured to: determine a first slice QP value for a first component of an attribute in a slice of the point cloud data; decode a first delta QP value for the first component of the attribute for a region in the slice; determine a first region QP value for the first component of the attribute in the region from the first slice QP value and from the first delta QP value; decode a second delta QP value for the second component of the attribute for the region; determine a second region QP value for the second component of the attribute in the region from the second delta QP value; and decode the point cloud data based on the first region QP value and further based on the second region QP value.

Aspect 87. The device of the preceding aspects or any combination thereof, wherein the one or more processors are configured to determine that a third delta QP value for the second component is not signaled for a second region in a second slice.

Aspect 88. The device of the preceding aspects or any combination thereof, wherein the one or more processors are configured to set a third region QP value for the second component for the second region to be equal to a third slice QP value for the second component for the second slice in response to determining that a third delta QP value for the second component is not signaled for the second region.

Aspect 89. The device of the preceding aspects or any combination thereof, wherein the one or more processors are configured to determine a second slice QP value for a second component for the slice from the first region QP value.

Aspect 90. The device of the preceding aspects or any combination thereof, wherein the one or more processors are configured to determine the second region QP value by at least determining the second region QP value from the second delta QP value and also from a second slice QP value.

Aspect 91. The device of the preceding aspects or any combination thereof, wherein the one or more processors are configured to further comprising a display, wherein the one or more processors are configured to present the point cloud data via the display.

Aspect 92. The device of the preceding aspects or any combination thereof, wherein the one or more processors are configured to perform the method of aspects 30-74 or any combination thereof.

Aspect 93. A computer-readable storage medium having stored thereon instructions that, when executed, cause one or more processors to decode an initial QP value from an attribute parameter set; determine a first QP value for a first component of the attribute of the point cloud data from the initial QP value; determine a QP offset value for a second component of the attribute of the point cloud data; determine a second QP value for the second component of the attribute from the first QP value and from the QP offset value; and decode the point cloud data based on the first QP value and further based on the second QP value.

Aspect 94. A computer-readable storage medium having stored thereon instructions that, when executed, cause one or more processors to determine a first slice QP value for a first component of an attribute in a slice of the point cloud data; decode a first delta QP value for the first component of the attribute for a region in the slice; determine a first region QP value for the first component of the attribute in the region from the first slice QP value and from the first delta QP value; decode a second delta QP value for the second component of the attribute for the region; determine a second region QP value for the second component of the attribute in the region from the second delta QP value; and decode the point cloud data based on the first region QP value and further based on the second region QP value.

Aspect 95. The computer-readable medium of the preceding aspects or any combination thereof, further including instructions that, when executed, cause the one or more processors to perform the method of aspects 30-74 or any combination thereof.

Aspect 96. A system includes means for decoding an initial QP value from an attribute parameter set; means for determining a first QP value for a first component of an attribute of the point cloud data from the initial QP value; means for determining a QP offset value for a second component of the attribute of the point cloud data; means for determining a second QP value for the second component of the attribute from the first QP value and from the QP offset value; and means for decoding the point cloud data based on the first QP value and further based on the second QP value.

Aspect 97. A system includes means for determining a first slice QP value for a first component of an attribute in a slice of the point cloud data; means for decoding a first delta QP value for the first component of the attribute for a region in the slice; means for determining a first region QP value for the first component of the attribute in the region from the first slice QP value and from the first delta QP value; means for decoding a second delta QP value for the second component of the attribute for the region; means for determining a second region QP value for the second component of the attribute in the region from the second delta QP value; and means for decoding the point cloud data based on the first region QP value and further based on the second region QP value.

Aspect 98. The system of the preceding aspects or any combination thereof, further including means for performing the method of aspects 30-74 or any combination thereof.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding point cloud data, the method comprising:

decoding a first delta quantization parameter (QP) value for a first component of an attribute for a region in a slice;

determining a first QP value for the first component of the attribute in the region from the first delta QP value;

decoding a second delta QP value for a second component of the attribute for the region;

determining a second QP value for the second component of the attribute in the region from the second delta QP value; and decoding the point cloud data based on the first QP value and further based on the second QP value.

2. The method of claim 1, wherein the first component of the attribute is a luma component of the point cloud data, and wherein the second component of the attribute is one or more chroma components of the point cloud data.

3. The method of claim 1, wherein the first component of the attribute is a first chroma component of the point cloud data, and wherein the second component of the attribute is a second chroma component of the point cloud data.

4. The method of claim 1, further comprising:

decoding a first syntax element representing the first delta QP value; and decoding a second syntax element representing the second delta QP value for the second component for the region by at least decoding the second syntax element separately from decoding the first syntax element.

5. The method of claim 1, further comprising determining a bitdepth of the second component based on a bitdepth of the first component and further based on a flag, wherein the flag comprises a single bit in a sequence parameter set.

6. The method of claim 5, wherein the flag indicates whether the bitdepth of the second component is equal to the bitdepth of the first component.

7. The method of claim 5, further comprising setting the bitdepth of the second component equal to a maximum bitdepth regardless of a value of the flag in response to determining that the bitdepth of the first component is greater than or equal to the maximum bitdepth.

8. The method of claim 5, wherein the bitdepth of the second component is constrained to be equal to the bitdepth of the first component or equal to the bitdepth of the first component plus one.

9. The method of claim 1, further comprising presenting at least a portion of the point cloud data via a display.

10. A device for decoding point cloud data, the device comprising:
   memory configured to store point cloud data; and
   one or more processors, implemented in circuitry and communicatively, coupled to the memory, the one or more processors being configured to:
      decode a first delta quantization parameter (QP) value for a first component of an attribute for a region in a slice;
      determine a first QP value for the first component of the attribute in the region from the first delta QP value;
      decode a second delta QP value for a second component of the attribute for the region;
      determine a second QP value for the second component of the attribute in the region from the second delta QP value; and
      decode the point cloud data based on the first QP value and further based on the second QP value.

11. The device of claim 10,
   wherein the first component of the attribute is a luma component of the point cloud data, and
   wherein the second component of the attribute is one or more chroma components of the point cloud data.

12. The device of claim 10, wherein the first component of the attribute is a first chroma component of the point cloud data, and wherein the second component of the attribute is a second chroma component of the point cloud data.

13. The device of claim 10, wherein the one or more processors are further configured to:
   decode a first syntax element representing the first delta QP value; and
   decode a second syntax element representing the second delta QP value for the second component for the region based on a separate decode of the second syntax element from a separate decode of the first syntax element.

14. The device of claim 10, wherein the one or more processors are further configured to:
   determine a bitdepth of the second component based on a bitdepth of the first component and further based on a flag, wherein the flag comprises a single bit in a sequence parameter set.

15. The device of claim 14, wherein the flag indicates whether the bitdepth of the second component is equal to the bitdepth of the first component.

16. The device of claim 14, wherein the one or more processors are further configured to:
   set the bitdepth of the second component equal to a maximum bitdepth regardless of a value of the flag in response to determining that the bitdepth of the first component is greater than or equal to the maximum bitdepth.

17. The device of claim 14, wherein the bitdepth of the second component is constrained to be equal to the bitdepth of the first component or equal to the bitdepth of the first component plus one.

18. The device of claim 10, further comprising:
   a display configured to present at least a portion of the point cloud data.

19. A non-transitory computer-readable medium storing instructions that, when executed, causes one or more processors to:
   decode a first delta quantization parameter (QP) value for a first component of an attribute for a region in a slice;
   determine a first QP value for the, first component of the attribute in the region from the first delta QP value;
   decode a second delta QP value for a second component of the attribute for the region;
   determine a second QP value for the second component of the attribute in the region from the second delta QP value; and
   decode the point cloud data based on the first QP value and further based on the second QP value.

* * * * *